(12) United States Patent
Okumura et al.

(10) Patent No.: US 6,803,560 B1
(45) Date of Patent: Oct. 12, 2004

(54) OPTICAL ENCODER

(75) Inventors: Ichiro Okumura, Matsudo (JP);
Yasushi Miura, Yokohama (JP);
Masahiko Igaki, Yokohama (JP);
Manabu Takayama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/588,549

(22) Filed: Jun. 7, 2000

(30) Foreign Application Priority Data

| Jun. 10, 1999 | (JP) | ............................................ | 11-164469 |
| Jun. 10, 1999 | (JP) | ............................................ | 11-164470 |
| Jun. 17, 1999 | (JP) | ............................................ | 11-171565 |

(51) Int. Cl.[7] ................................................. G01D 5/34
(52) U.S. Cl. ............................... 250/231.16; 250/231.13
(58) Field of Search ......................... 250/231.16, 237 G, 250/231.13, 231.14, 231.17, 231.18; 341/11, 13

(56) References Cited

U.S. PATENT DOCUMENTS

| 3,856,401 | A | * | 12/1974 | Heitmann et al. | ............. | 356/28 |
| 4,746,792 | A | * | 5/1988 | Dil | ............................. | 356/499 |
| 5,124,548 | A | * | 6/1992 | Igaki | ...................... | 250/231.16 |
| 5,483,059 | A | * | 1/1996 | Igaki et al. | ............. | 250/231.16 |
| 5,498,870 | A | * | 3/1996 | Ishizuka | .................. | 250/237 G |

FOREIGN PATENT DOCUMENTS

| JP | 11-23324 | | 1/1999 | | |
| JP | 11-023324 | * | 1/1999 | ............ | G01D/5/38 |

* cited by examiner

Primary Examiner—Edward J. Glick
Assistant Examiner—Chih-Cheng Kao
(74) Attorney, Agent, or Firm—Fitzpatrick, Cella, Harper & Scinto

(57) ABSTRACT

An optical encoder has a light irradiating device; an optical scale having a grating for transmitting or reflecting incident light; light-receiving elements disposed in a plurality of different directions; and an optical system for amplitude-modulating light traveling from the light irradiating device to the optical scale and transmitted or reflected by the grating, by a dividing element in which a plurality of V-shaped grooves are juxtaposed, and for dividing the amplitude-modulated light into beams along a plurality of different directions to guide the beams to the respective light-receiving elements. The dividing element is comprised of repetitions of such structure that a plurality of V-grooves consisting of planes of mutually different angles are juxtaposed at a predetermined pitch.

11 Claims, 22 Drawing Sheets

OPTICAL ENCODER

BACKGROUND OF THE INVENTION

1. Field of the Invention

The present invention relates to an optical encoder for detecting movement information with high accuracy.

2. Related Background Art

The conventionally known methods for detecting the position or speed of a moving object are roughly classified in methods with a magnetic encoder and methods with an optical encoder. Optical encoders are usually comprised of a light-projecting section, a light-receiving section, and a scale and the scale is normally made of a thin SUS material by precise press blanking or by etching.

In recent years, however, suggestions have been made on the optical encoders using the scale of a transparent material provided with grooves of V-shaped cross section, for example, as described in Japanese Patent Application Laid-Open No. 11-23324 etc., and they are used in printers, copying machines, and so on.

FIG. 1 is a perspective view of an optical system in a self-emitting optical encoder of a conventional example and FIG. 2 is a cross-sectional view thereof. The optical encoder is provided with a light-irradiating device 3 comprised of a light source 1 such as an LED or a semiconductor laser for emitting coherent light, for example, of the wavelength of 632.8 nm, and a lens system 2 consisting of a spherical lens or an aspherical lens; an optical scale 4 with a grating having the phase difference detecting function and amplitude diffraction grating function; a concave mirror 5 having a curved surface matching with the Fourier transform surface of the grating and having the optical axis O1 decentered by a center difference Δ relative to the optical axis O of a central beam of incident light; and a light-receiving device 6 consisting of light-receiving elements 6a, 6b, 6c being three photodetectors. The output of the light-receiving device 6 is connected to a signal processing unit 7 having a pulse-counting circuit and a rotational direction determining circuit, and the light-irradiating device 3 and light-receiving device 6 are held in a fixed state in a housing 8. The optical scale 4 is attached to part of a rotating body not illustrated and is under rotation in the direction of an arrow D about the rotational axis O2 together with the rotating body.

FIG. 3 is a plan view of the optical scale in which the grating of the optical scale 4 is formed so that two slopes I1, I2 forming a V-groove, and one flat F appear alternately at a predetermined pitch P and are formed continuously in radial directions, as illustrated in FIGS. 4A, 4B. The width of the V-groove is P/2, and each of the two slopes I1, I2 forming the V-groove has the width of P/4 and is inclined at an angle not less than the critical angle, for example, at the angle θ=45°, relative to the flat F.

The grating has a first region 4a of the shape illustrated in FIG. 4A radially inside and a second region 4b of the shape illustrated in FIG. 4B radially outside. Each of FIG. 4A and FIG. 4B includes a front view and a cross-sectional view of the corresponding region. Since the scale grooves are radially continuous, the number N1 of V-grooves in the first region 4a is equal to the number N2 of V-grooves in the second region 4b (N1=N2). A ratio (R2/R1) of the distance R2 from the rotation center O2 of the optical scale 4 to the second region 4b, to the distance R1 similarly to the first region 4a is equal to a ratio (P2/P1) of the scale pitch P2 of the second region 4b to the scale pitch P1 of the first region 4a (i.e., R2/R1=P2/P1).

The light from the light source 1 being one element of the light-emitting device 3 is condensed by the lens system 2 onto the optical scale 4. The light incident to the first region 4a of the optical scale 4 is diffracted by the grating and the nth-order diffracted light (0-order and ±1-order diffracted light) is condensed at or near the pupil position of the concave mirror 5.

The concave mirror 5 reflects these three diffracted light beams thus condensed to form an interference pattern image based on these three diffracted beams in the second region 4b on the surface of the optical scale 4. At this time, with movement of the optical scale 4 in the rotation direction D, the thus formed image moves in the direction opposite to the rotation direction D. Namely, the interference pattern image is displaced relative to the grating by double the movement of the optical scale 4. This enables acquisition of rotation information in the resolution of double the grating formed in the optical scale 4.

Beams based on the phase relation between the interference pattern image formed near the second region 4b of the optical scale 4 and the V-grooves of the grating are geometrically refracted by the second region 4b, three beams emerging from the second region 4b are received by the three light-receiving elements 6a, 6b, 6c of the light-receiving device 6, respectively, and signals from this light-receiving device 6 are processed by the signal processing unit 7 to obtain the rotation information.

FIG. 5A shows the convergent light incident onto the grating of the first region 4a of the optical scale 4, and beams arriving at the flats F of the grating among the light travel through the flats F toward the concave mirror 5 to be focused on the surface thereof. Since the slope angle of the slopes I1 is set over the critical angle, a beam arriving at each slope I1 forming the V-groove is totally reflected toward the other slope I2 together forming a V-groove and then is totally reflected again by the slope I2.

In this manner the beams finally arriving at the slopes I1 of the grating are reflected back opposite to the incident direction without entering the inside of the optical scale 4. Likewise, the beams arriving at the other slopes I2 are also totally reflected twice back opposite to the incident direction. Therefore, the beams arriving at the two slopes I1, I2 are not transmitted but reflected by the optical scale 4, whereas only the beams arriving at the flats F travel through the optical scale 4, in the first region 4a.

In the first region 4a the V-grooved grating has the optical action similar to the transmissive amplitude diffraction grating. Namely, the light is diffracted by the grating of the first region 4a to generate beams of 0-order, ±1-order, ±2-order, . . . diffracted light by the action of the grating, and the beams are condensed on the surface of the concave mirror 5. The diffracted light thus condensed is reflected by the concave mirror 5 to enter the second region 4b of the optical scale 4, as illustrated in FIG. 5B, thereby forming an image of radial grooves on the surface of the optical scale 4. Since the first region 4a and the second region 4b are radially different regions (which may overlap with each other in part) of the radial grating on the surface of the optical scale 4, the grating pitches of the first region 4a and the second region 4b are different from each other, and the inside and outside pitches of the optical scale 4 are also different even in the irradiation area of the second region 4b.

In this prior art example, therefore, the grating of the first region 4a is enlargingly projected onto the second region 4b so that a reversed image thereof may be formed at the same pitch as that of the radial grating of the optical scale 4. For this purpose, the concave mirror 5 is designed to have a desired radius R of curvature and be decentered from the optical axis O of the incident light and the deviation Δ of the concave mirror 5 from the optical axis O of incidence is set so as to make the enlargement projection magnification optimum. In this way the pitches of the radial grating are matched in part for formation of the grating image of the first region 4a on the surface of the second region 4b by the concave mirror 5, thereby obtaining detection signals with good S/N ratios.

The beams incident to the flats F in the second region 4b travel straight relative to the slopes I1, I2, as illustrated in FIG. 5C, to reach the center light-receiving element 6b of the light-receiving device 6. Since the beams arriving at the two slopes I1, I2 forming the V-grooves are incident at the angle of incidence of 45° to each surface, the beams are largely refracted into directions different from each other, to reach the light-receiving elements 6a, 6c at the both ends of the light-receiving device 6.

In the second region 4b the beams thus travel in the three separate directions because of the totally three types of surfaces along the different slope directions, the two slopes I1, I2 inclined in the different directions to the incident light, and the flat F between V-grooves, and then they reach the respective light-receiving elements 6a, 6b, 6c provided at their respective positions corresponding to the surfaces. Namely, the beams based on the phase relation between the grating of the second region 4b and the interference pattern image formed on the surface thereof are deflected into the three directions to be focused on the respective light-receiving elements 6a, 6b, 6c, and thus the grating of V-grooves functions as a lightwave wavefront splitting element in the second region 4b.

With rotation of the optical scale 4, there will occur variation in amounts of light detected by the respective light-receiving elements 6a, 6b, 6c. A light-amount balance among the beams incident to the respective light-receiving elements 6a, 6b, 6c varies according to relative displacement between the position of the grating and the position of the interference pattern image. As a result, in the case of counterclockwise rotation of the optical scale 4, the light-amount variation as illustrated in FIG. 6 appears with rotation of the optical scale 4. In this figure, the horizontal axis represents rotation amounts of the optical scale 4, the vertical axis represents amounts of received light, and signals a, b, c correspond to outputs of the respective light-receiving elements 6a, 6b, 6c. In the case of clockwise rotation of the optical scale 4 on the other hand, the signal a indicates the output of the light-receiving element 6b, the signal b the output of the light-receiving element 6a, and the signal c the output of the light-receiving element 6c. Pulse signals are generated based on these signals and are processed to yield the rotation information such as the angle or amount of rotation of the optical scale 4, or rotating speed, rotating acceleration, etc. thereof. FIG. 6 shows the theoretical light-amount variation obtained when the contrast of the interference pattern image formed on the second region 4b is very high and almost ideal.

FIG. 7 is a perspective view of a second conventional example, in which the optical encoder is provided with a light source 11 such as the LED or the semiconductor laser, a lens system 12 consisting of a spherical lens or an aspherical lens for converting divergent light from the light source 11 into parallel light, a scale 13 having the amplitude grating function and being driven to rotate, a fixed scale 14 consisting of two grating portions 14a, 14b having the same pitch as that of the optical scale 13, and a light-receiving device 15 having two light-receiving elements 15a, 15b set with a phase shift of a quarter pitch.

The substrate of the optical scale 13 is made of a transparent optical material and a grating portion 13a, in which a plurality of opaque portions are radially formed in fixed periods, is provided on the surface of the transparent substrate. It is also possible to employ such structure that the substrate of an opaque material is provided with the grating portion having a plurality of radially long holes in fixed periods, on the other hand. The optical scale 13 is attached to part of the rotating body not illustrated and is rotated in the direction of arrow D about the rotation axis O3 together with the rotating body.

The light emitted from the light source 11 is converted into parallel light by the lens system 12 to travel through the optical scale 13 and the fixed scale 14. The light passing through the grating portion 14a of the fixed scale 14 is received by the light-receiving element 15a of the light-receiving device 15, while the light passing through the grating portion 14b by the light-receiving element 15b.

Since the optical scale 13 is rotating about the rotation axis O3, the light-receiving device 15 receives a maximum amount of light from the light source 11 when the phase of the grating portion 13a of the optical scale 13 becomes coincident with the phase of the grating portion 14a or 14b of the fixed scale 14. In contrast, the light-receiving device 15 receives a minimum amount of light when the phases are opposite. Therefore, amounts of light detected by the light-receiving elements 15a, 15b vary with rotation of the optical scale 13. Namely, the light-amount balance between the beams incident to the respective light-receiving elements 15a, 15b varies according to the relative change between the position of the grating portion 13a and the image position.

FIG. 8 is a graph to show the light amount variation with rotation of the optical scale 13, in which the horizontal axis represents rotation amounts of the optical scale 13 and the vertical axis amounts of received light. This FIG. 8 shows the state of theoretical light amount variation obtained when the contrast is very high and almost ideal. With counterclockwise rotation of the optical scale 13, the light-receiving elements 15a, 15b output the light amount variations indicated by signals a, b, respectively. With clockwise rotation of the optical scale 13 on the other hand, the light-receiving element 15a provides the output of the light amount variation of signal b, and the light-receiving element 15b the output of the light amount variation of signal a. Pulse signals are generated based on these signals and are used to detect the rotation information such as the angle or amount of rotation of the optical scale 13, or the rotating speed, the rotating acceleration, etc. thereof.

SUMMARY OF THE INVENTION

For accomplishing improvement in the conventional examples as described above, a first object of the present invention is to provide an optical encoder capable of always generating stable pulses without variation in the width and phase even if there occurs variation in amounts of light.

A second object of the present invention is to provide an optical encoder capable of detecting signals with good contrast against scales of all diameters by use of a common detection head.

A third object of the present invention is to provide an optical encoder capable of detecting displacement information with good contrast in compact structure, particularly, in terms of the axial height.

The other objects of the present invention will become apparent in the description of embodiments which follows.

DETAILED DESCRIPTION OF THE PREFERRED EMBODIMENTS

For accomplishing the first object described above, the optical encoder is constructed to make the light from the light-irradiating device incident to the optical scale, amplitude-modulate the light transmitted or reflected by the grating of the optical scale, by a dividing element in which a plurality of V-shaped grooves consisting of planes having different angles are arranged repeatedly at a predetermined pitch and in parallel, split the amplitude-modulated light into beams along a plurality of different directions, and detect the beams by respective, separate light-receiving elements.

The optical encoder will be described below in detail, based on the embodiments illustrated.

Figure 1:
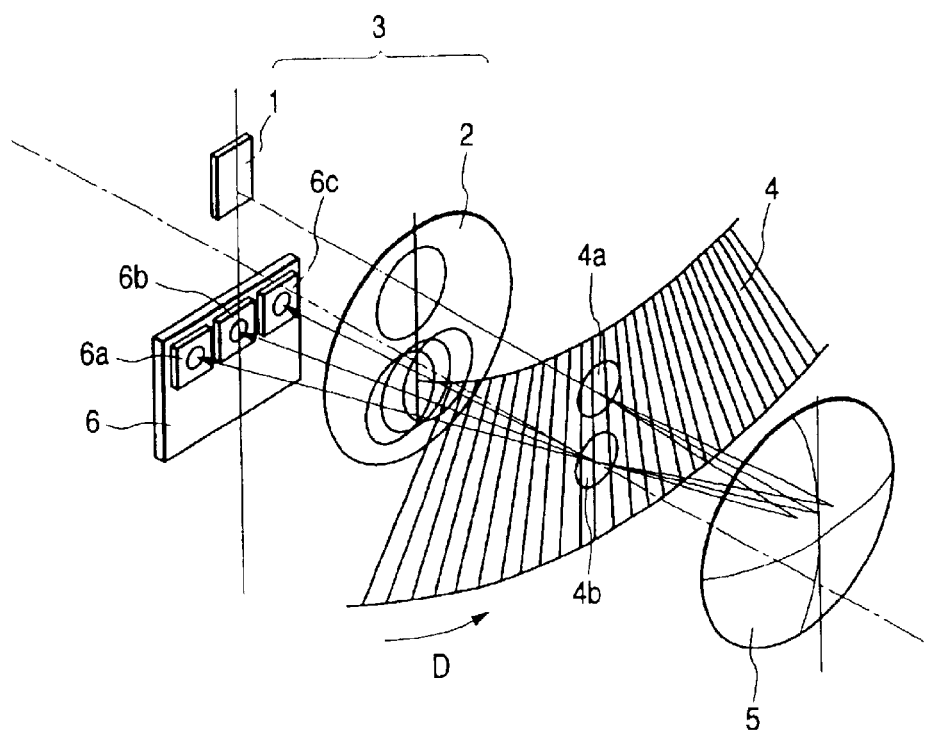
FIG. 1 is a perspective view of the optical system of the self-emitting optical encoder of the conventional example.
Figure 3:
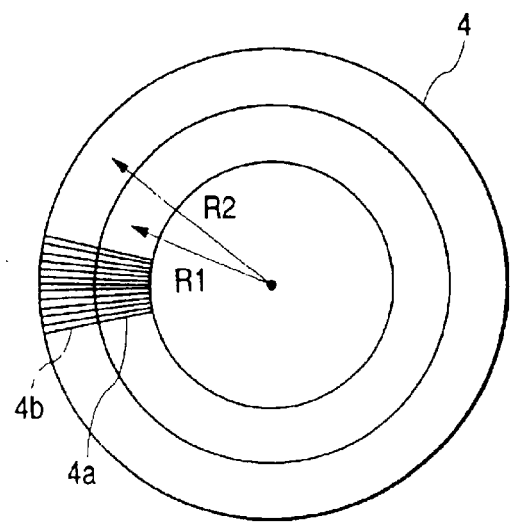
FIG. 3 is a plan view of the optical scale of the optical encoder.
Figure 2:
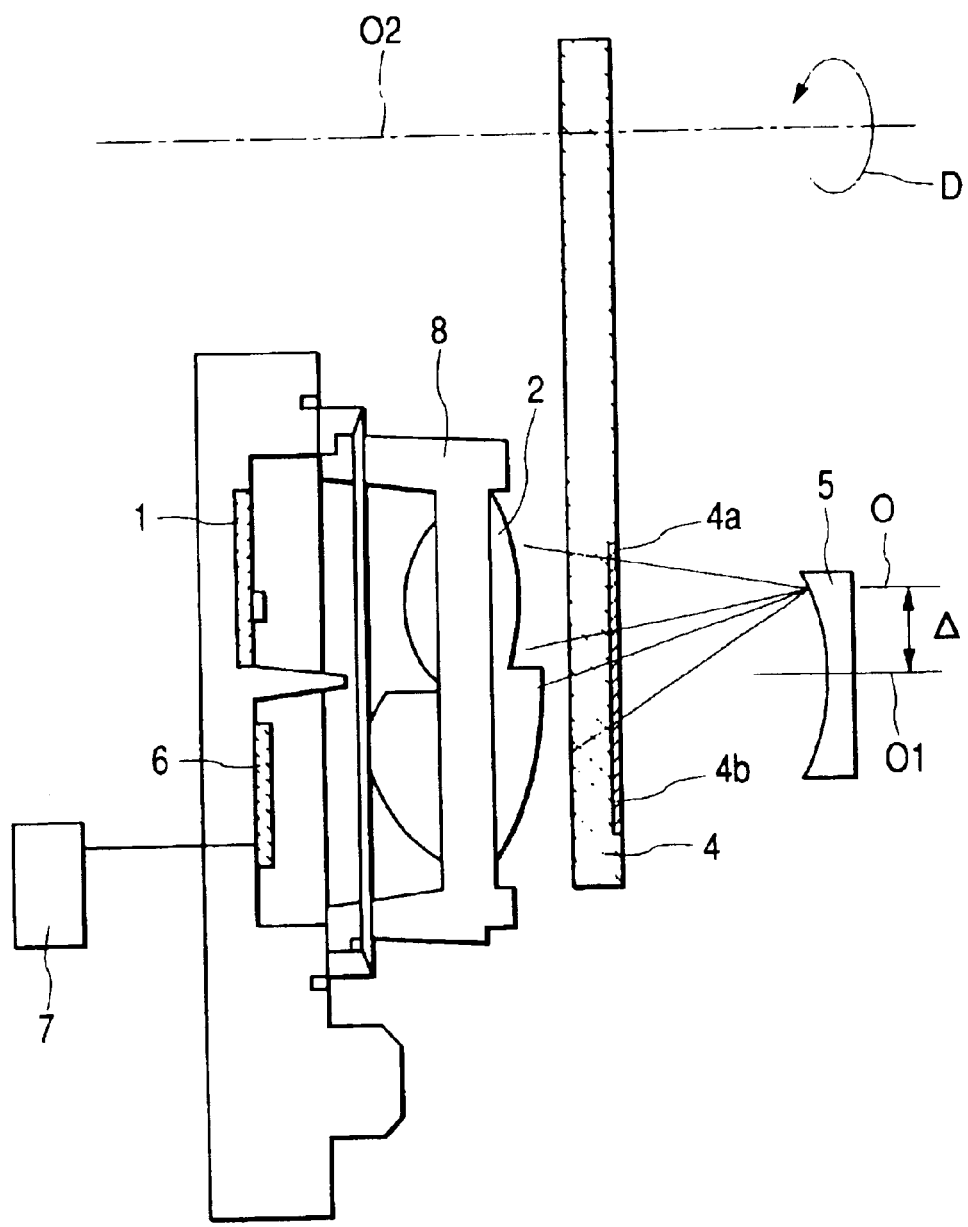
FIG. 2 is a cross-sectional view of the optical system of FIG. 1.
Figure 9:
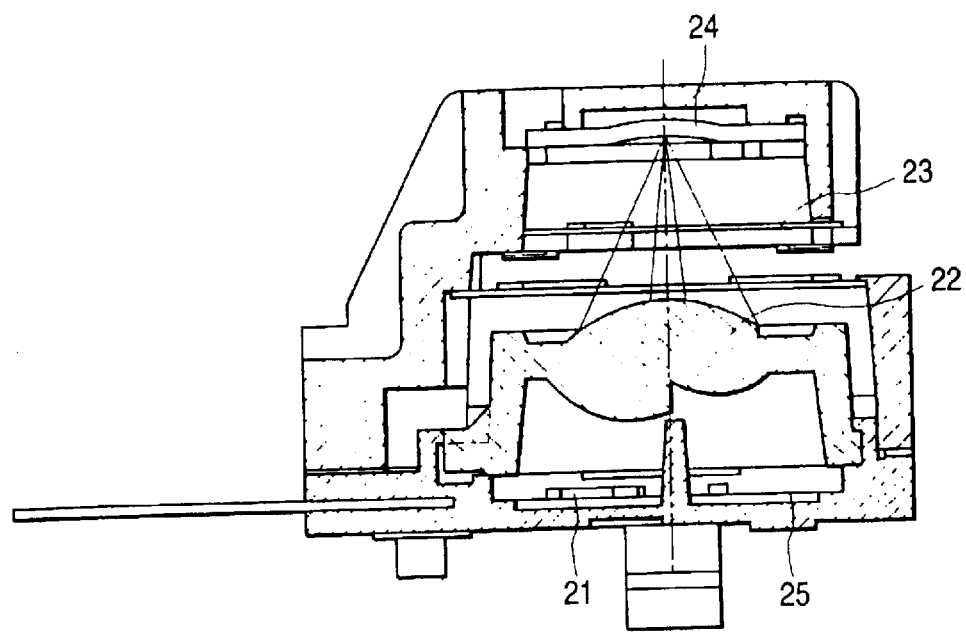
FIG. 9 is a cross-sectional view of the detection head in the first embodiment.
Figure 10:
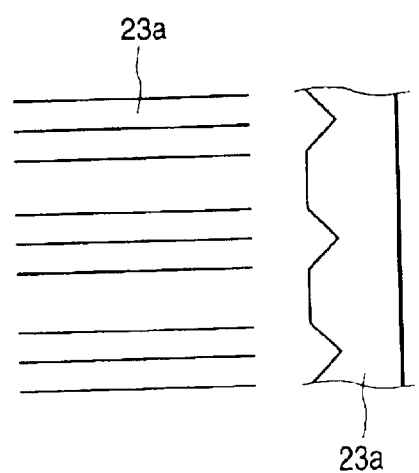
FIG. 10 is an explanatory diagram of the groove pattern in the first region of the optical scale.
Figure 11:
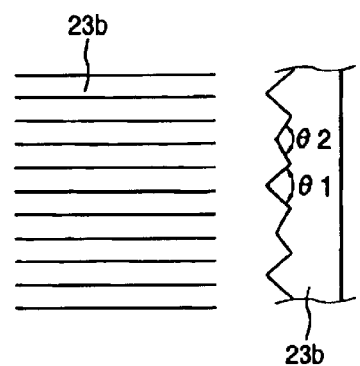
FIG. 11 is an explanatory diagram of the groove pattern in the second region.

FIG. 9 is a cross-sectional view of the detection head in the first embodiment, FIG. 10 shows the first region of the optical scale, and FIG. 11 the second region thereof. The detection head is composed, for example, of the light source 21 such as the LED or the semiconductor laser, the spherical or aspherical lens 22, the optical scale 23 made of a transparent material and rotating about the rotation axis, the concave mirror 24, and the light-receiving device 25, as in the first conventional example of FIG. 1. One surface of the lens 22 includes the surface shapes, different from each other, on the light projection side and on the light reception side.

Figure 4A:
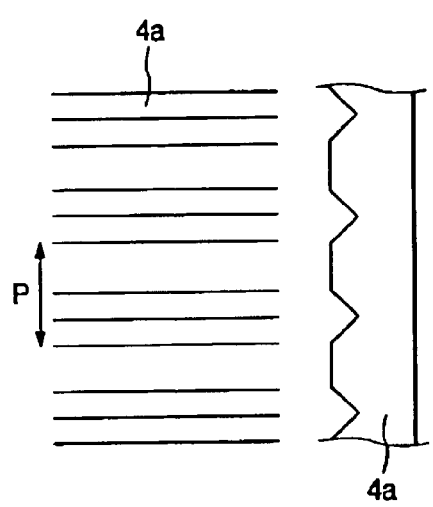
FIG. 4A and FIG. 4B are explanatory diagrams of the V-groove grating of the optical scale.
Figure 4B:
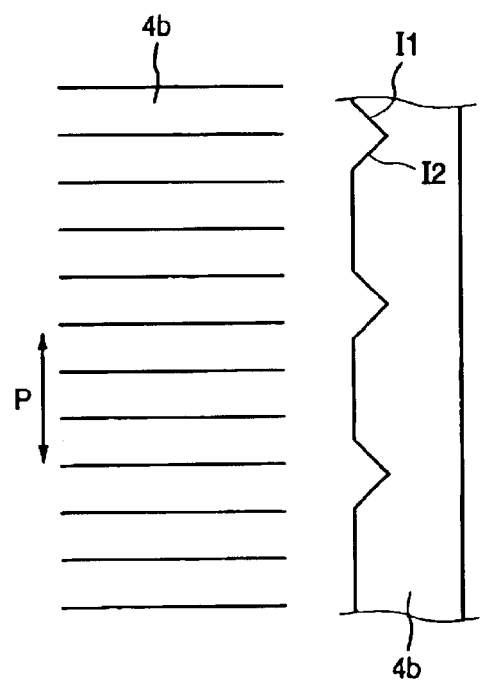

In the first region 23a of the optical scale 23, as illustrated in FIG. 10, repetitions of slopes and flats are formed at a predetermined pitch, as in the conventional example of FIG. 4A, but in the second region 23b of the present embodiment, as illustrated in FIG. 11, W-shaped grooves are formed of repetitions of alternate slopes having two angles θ1, θ2. A front view and a cross-sectional view of each region are illustrated in each of FIG. 10 and FIG. 11.

Figure 12A:
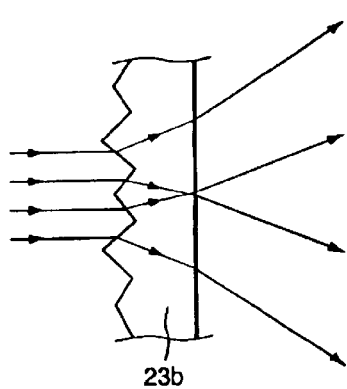
FIG. 12A and FIG. 12B are explanatory diagrams of split reception paths of beams.
Figure 12B:
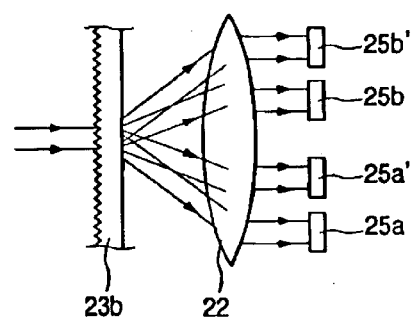

As constructed in this structure, the light emitted from the light source 21 is guided through the light projection side of the lens 22 into the first region 23a of the optical scale 23 and the beams passing through the flats of the first region 23a travel in the form of parallel light to be reflected by the concave mirror 24. The reflected light travels again toward the optical scale 23 to be refracted into four directions by the second region 23b of the optical scale 23, as illustrated in FIG. 12A. The beams then travel through the light reception side of the lens 22 to be distributed to four light-receiving elements 25a, 25a', 25b, 25b' of the light-receiving device 25 to form their respective images thereon, as illustrated in FIG. 12B.

Figure 13A:
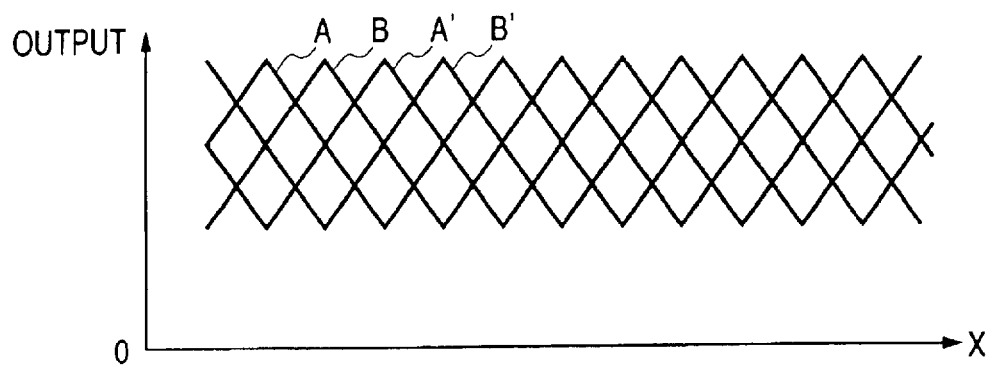
FIG. 13A and FIG. 13B are graphs of output waveforms and processed signals.
Figure 13B:
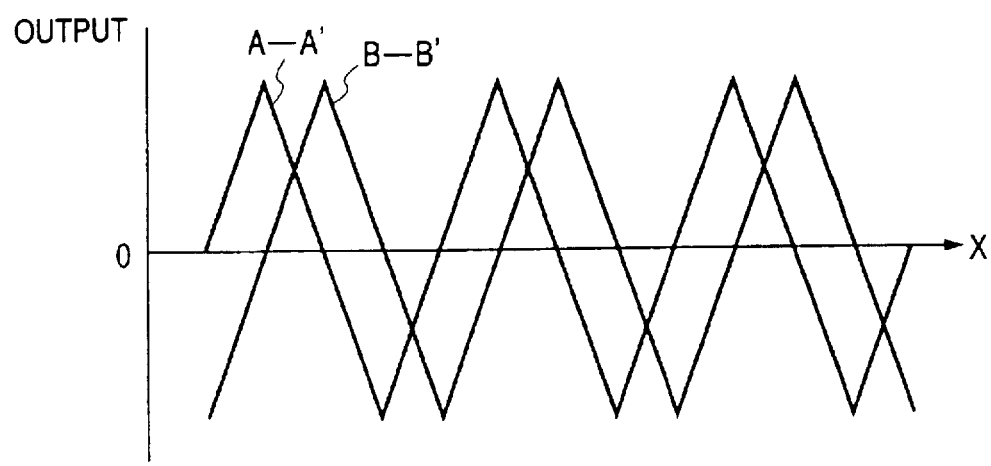

FIG. 13A is a diagram to show output waveforms of the respective light-receiving elements 25a, 25a', 25b, 25b', in which the horizontal axis represents relative displacement x between the optical scale 23 and the light-receiving device 25 and the vertical axis outputs A, A', B, B' of the respective light-receiving elements 25a, 25a', 25b, 25b'. There is the phase difference of 180° between the outputs A and A' and between the outputs B and B'. Therefore, the difference between the outputs A and A' and the difference between the outputs B and B' are waveforms oscillating around the center of 0 volt as illustrated in FIG. 13B. From the waveforms oscillating around the center of 0 volt as described, pulses can be generated using the 0 volt as a comparison reference threshold, whereby stable pulses can be always generated without variation in the width and the phase even if there occurs variation in amounts of light.

The groove shape of the second region 23b does not have to be limited to the W-shape, but may also be any shape that can split the light into plural directions. For example, where there is no need for discrimination of direction of rotation, a pulse signal of a single phase can be obtained by dividing the light into two beams in the phase relation of 180° and using a difference between them as a basic analog signal. Three-phase pulse signals can also be obtained in the phase relation of 120° by dividing the light into six beams in the phase relation of 60°, detecting them by six separate light-receiving elements, and using differences between two output signals in the phase relation of 180°, as basic analog signals.

Figure 7:
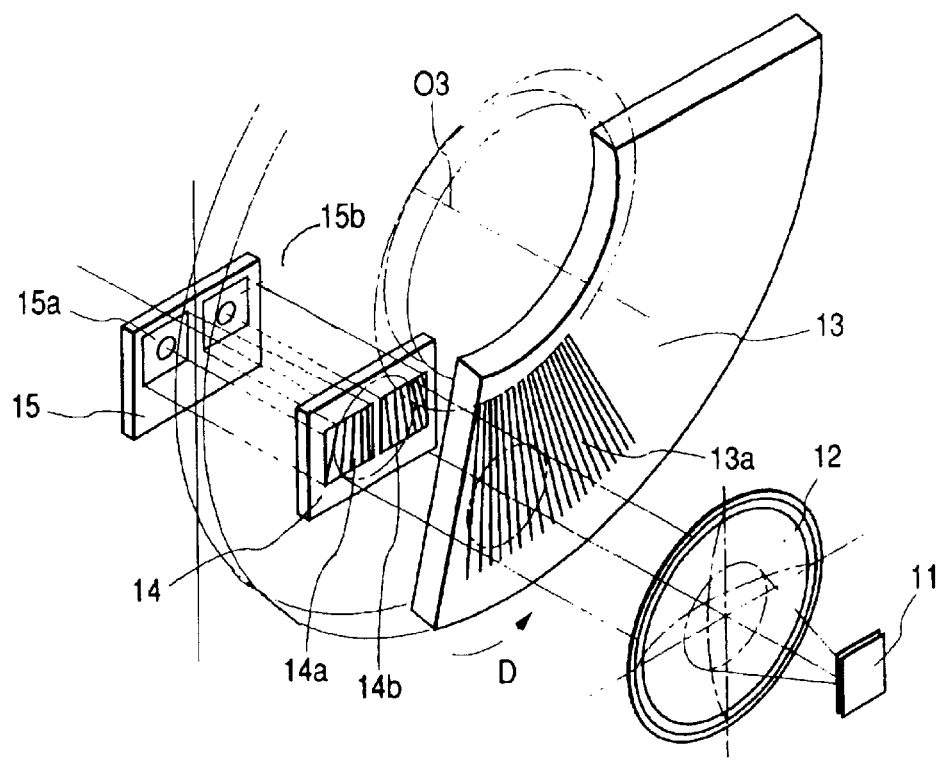
FIG. 7 is a perspective view of the second conventional example.

It is also possible to use the fixed scale 14 of the conventional example of FIG. 7. In this case, when the encoder is provided with the dividing element of the cross-sectional shape in the phase relation of 90° as illustrated in FIG. 10, the beams separated into four directions by the fixed scale are received by the four juxtaposed light-receiving elements 25a, 25a', 25b, 25b', thereby presenting the like effect.

Figure 14:
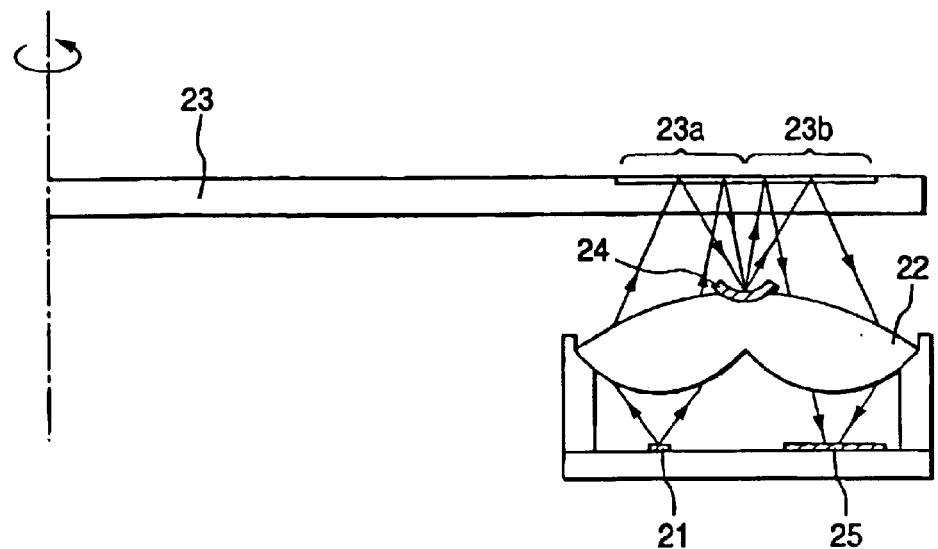
FIG. 14 is a cross-sectional view of the detection head in the second embodiment.

FIG. 14 is a cross-sectional view of the second embodiment, which is the optical encoder having the optical scale of the rotary type, but which can also be applied to a linear encoder moving rectilinearly. The optical encoder is comprised of the light-emitting element 21 such as the LED or LD, the lens 22 for focusing the beam from the light-emitting element, the optical scale 23 made of a transparent material such as polycarbonate or the like, the concave mirror 24 for reflecting incoming light from the optical scale 23 again toward the optical scale 23, and the light-receiving device 25 consisting of four light-receiving elements 25a, 25a', 25b, 25b' for receiving the reflected light from the optical scale 23 through the lens 22.

The disklike optical scale 23 is provided with the first region 23a and the second region 23b in which the optical grating is formed in a radial pattern. The number, the pitch, etc. of the grating grooves of the first region 23a do not always have to be matched with those of the second region 23b.

Figure 15:
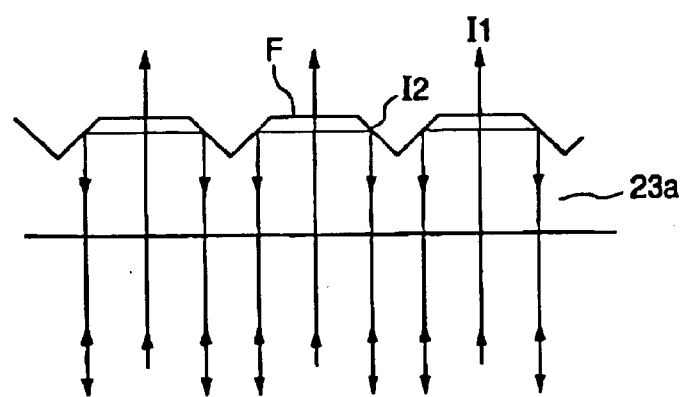
FIG. 15 is a cross-sectional view of the groove pattern in the first region.

FIG. 15 is a cross-sectional view of the first region 23a, and grooves of the V-shaped cross section are formed periodically at a predetermined pitch in the first region 23a. The angles of the slopes I1, I2 of these V-grooves are angles not less than the critical angle, for example 45°, in order to totally reflect the incident light, so that the light incident to the flats F is transmitted while the light incident to the slopes I1, I2 is reflected. Namely, in the first region 23a the grating portion of the V-grooves has the optical action similar to the reflective amplitude diffraction grating.

Figure 16:
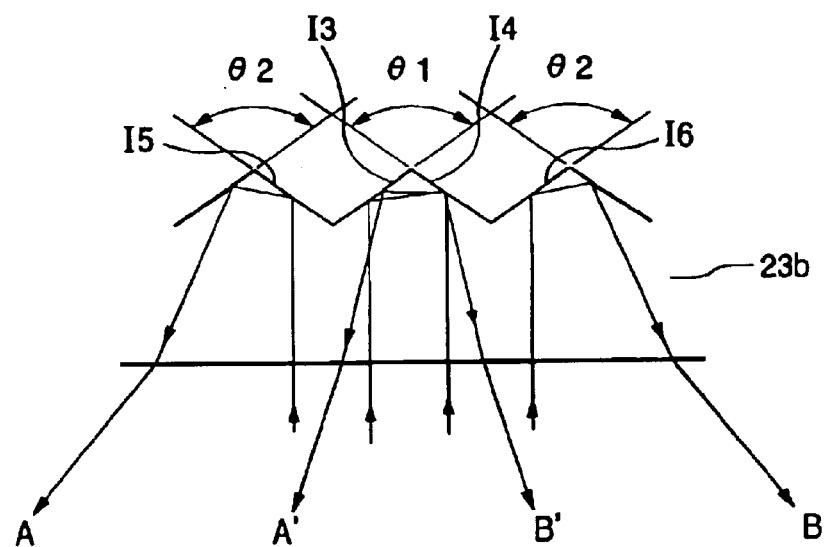
FIG. 16 is a cross-sectional view of the groove pattern in the second region.

FIG. 16 shows the cross-sectional shape of the grating of the second region 23b, and in the second region 23b the W-shaped grooves are formed of repetitions of alternate V-grooves of the angle θ1 between the slopes I3 and I4 and of the angle θ2 between slopes I5 and I6, which is slightly different from the angle θ1.

In the case of the present embodiment the shape of the grooves does not have to be limited to the W-shape, as in the first embodiment, but may be any shape that can divide the incident light into four or more directions. The reflecting surfaces do not have to be limited to those making use of the total reflection, but may also be surfaces provided with a reflecting film.

The light emitted from the light-emitting element 21 is converted into converging light by the lens 22 to be guided onto the first region 23a of the optical scale 23. The grating of this first region 23a diffracts the reflected light to generate beams of the 0-order, ±1-order, ±2-order, . . . diffracted light by the action of the grating, which are condensed on the surface of the concave mirror 24. The diffracted light thus condensed is reflected by the concave mirror 24 to be focused again on the second region 23b of the optical scale 23 to form an image of radial grooves on the surface of the optical scale 23.

In the second region 23b the beams incident to the left slopes I3 and the beams incident to the right slopes I4 are separated into right and left beams, while the beams incident to the slopes I5 and to the slopes I6 are separated into further outside beams.

Namely, the light reflected from the concave mirror 24 is reflected into four directions by the grooves of the second region 23b, and the beams thus separated into the four directions travel through the lens 22 to reach the light-receiving device 25. The beams are distributed to the four light-receiving elements 25a, 25a', 25b, 25b' to be received thereby.

The optical encoders described above are able always to generate stable pulses without variation in the width and the phase even under the varying condition in amounts of light, because they are constructed so that the beams amplitude-modulated by the dividing element in which the plurality of V-shaped grooves composed of the repetitions of planes of different angles are arranged at the predetermined pitch and in parallel, are divided into a plurality of different directions and are detected by the separate light-receiving elements, respectively.

For accomplishing the second object described previously, the optical encoder is constructed as an optical encoder for detecting the position and speed of a moving object by guiding the light from the light-irradiating device to the first region of the optical scale, reflecting the light incident to the first region by a mirror or an optical element back to the second region of the optical scale, and receiving the light via the grating portion of the optical scale by the light-receiving device, wherein scale slits of the first region and the second region are separate from each other (i.e., they are not of the structure continuous from each other). In the stated structure there is some contrivance implemented as described below.

The optical encoder will be described below in detail, based on the embodiments illustrated.

Figure 17:
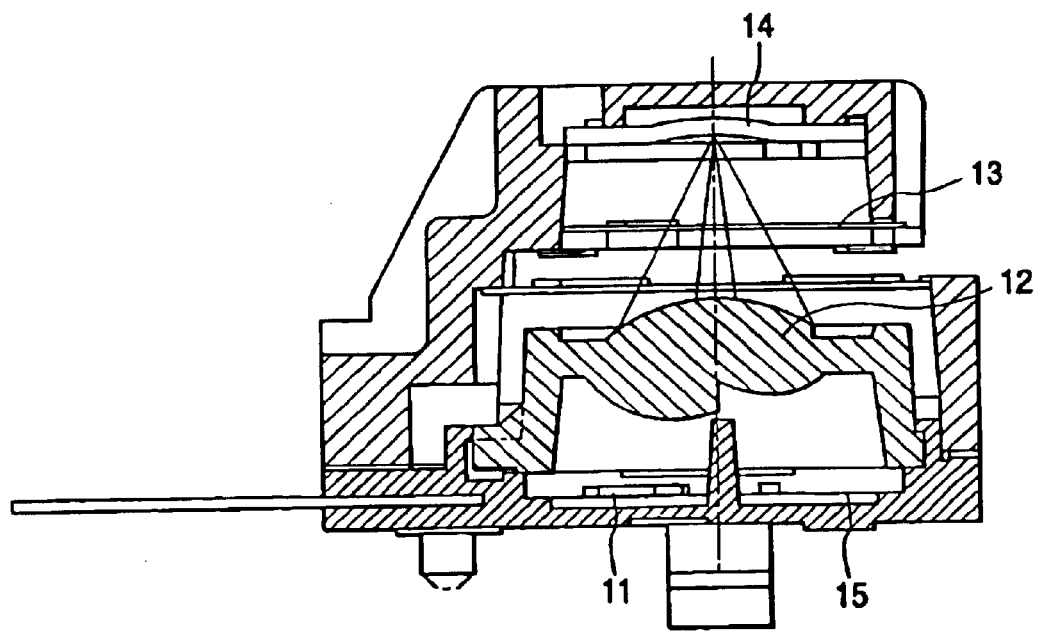
FIG. 17 is a cross-sectional view of the detection head in the third embodiment.

FIG. 17 is a cross-sectional view of the detection head in the third embodiment, and the detection head is composed of the light projecting device 11 such as the LED or the semiconductor laser light source, the spherical or aspherical lens 12, the optical scale 13 having slits formed in the surface and rotating about the rotation axis, the concave lens 14 placed on the optical axis of incidence, and the light-receiving device 15 consisting of a plurality of light-receiving elements, as in the case of the conventional example. One surface of the lens 12 has different shapes between on the light projection side and on the light reception side.

Figure 18:
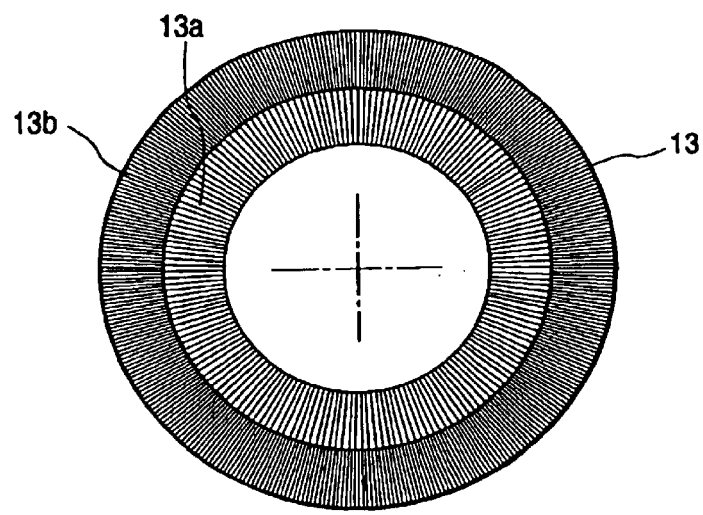
FIG. 18 is a plan view of the optical scale.
Figure 19A:
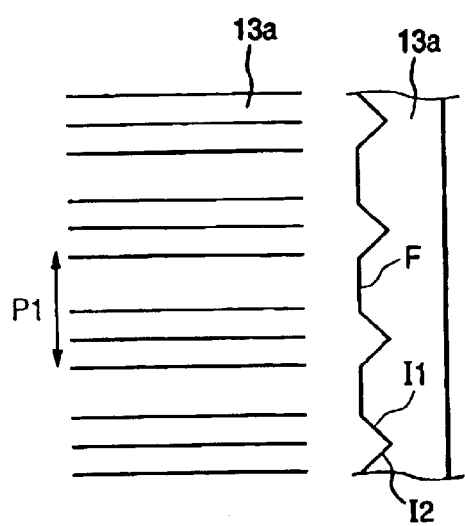
FIG. 19A and FIG. 19B are explanatory diagrams of the groove patterns of the scale.
Figure 19B:
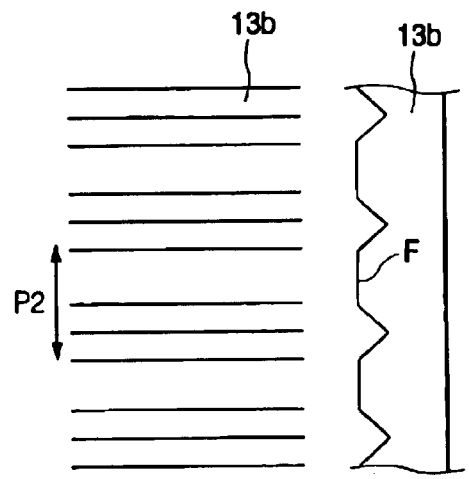

FIG. 18 is a plan view of the scale 13, and there are the first region 13a as illustrated in FIG. 19A and the second region 13b as illustrated in FIG. 19B with mutually different numbers of slits of the V-groove-shaped cross section on the optical scale 13. Since this optical scale 13 is constructed on the assumption of the enlargement projection magnification of 1 so that the scale pitch P1 of the first region 13a is approximately equal to the scale pitch P2 of the second region 13b, the ratio N2/N1 of the numbers of slits of the optical scale 13 is equal to the ratio R2/R1 of the radial center distances of the respective regions from the rotation center. R1 corresponds to the first region, while R2 to the second region.

As in the conventional example, the light from the light projecting device 11 travels through the light projection side of the lens 12 to reach the first region 13a of the optical scale 13 to be diffracted by the slits. The diffracted light travels toward the concave mirror 14 to be reflected by the concave mirror 14. The reflected light then travels through the second region 13b of the optical scale 13 and through the light reception side of the lens 12 to be received by the light-receiving device 15.

In a variety of optical scales such as the optical scales of small diameters and the optical scales of large diameters, or linear optical scales or the like, where the slits of the first region 13a and the second region 13b are separated from each other there becomes no need for the process in which the concave mirror 4 is set in the desired radius R of curvature and decentered from the optical axis O of incident light and in which the diameter of the optical scale 13 is set so as to make the enlargement projection magnification optimum by the concave mirror 14, with the deviation Δ from the optical axis O of incidence. As a consequence, the common detection head can be used in combination to the optical scales 13 of all diameters, which simplifies the optical system. The scale pitches were set as P1=P2 and the enlargement projection magnification of the detection head was 1 in the above embodiment. However, the magnification does not have to be limited to 1, but the common detection head can be used in combination with any scale by matching all the scale pitches with the enlargement projection magnification of the detection head.

Figure 20A:
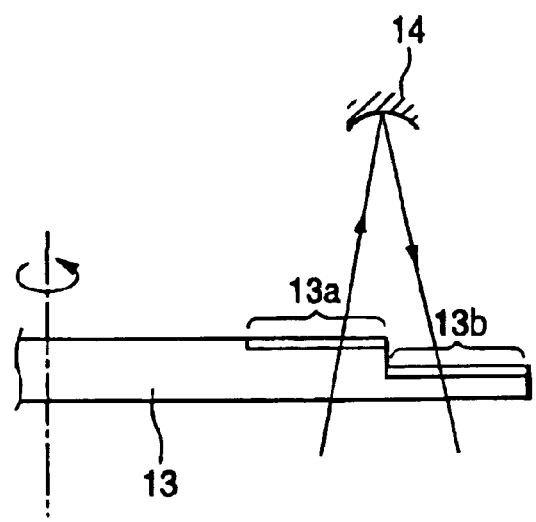
FIG. 20A and FIG. 20B are cross-sectional views of the optical scale in the fourth embodiment.
Figure 20B:
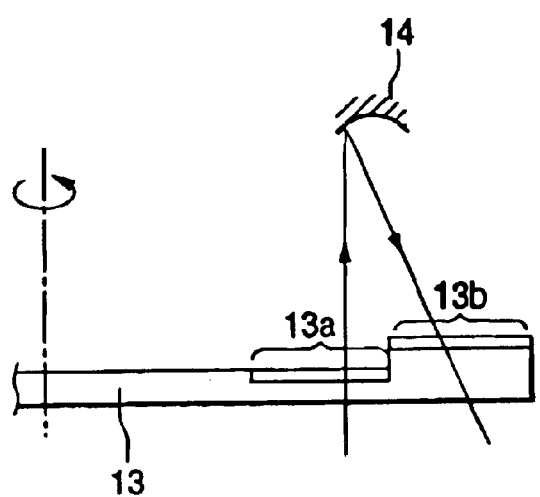

FIGS. 20A and 20B are cross-sectional views of scales in the fourth embodiment, in which the heights are different between the surfaces of the first region 13a and the second region 13b of the optical scale 13. In FIG. 20A the first region 13a is thicker than the second region 13b, whereas in FIG. 20B the second region 13b is thicker than the first region 13a. When this level difference is set to an appropriate value, depending upon the radius of the optical scale 13, the enlargement projection magnification can be matched with the ratio P2/P1 of the scale pitches under common use of the detection head.

Figure 21A:
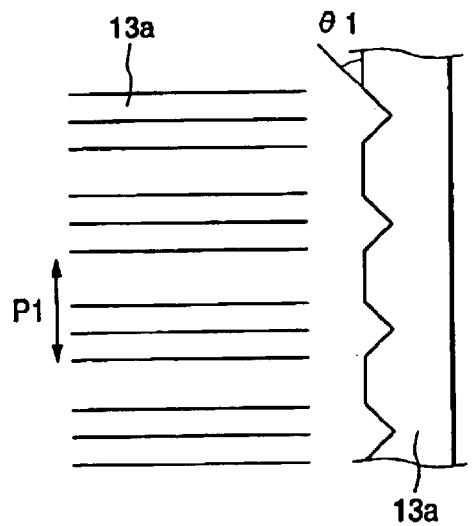
FIG. 21A and FIG. 21B are explanatory diagrams of the groove patterns of the optical scale in the fifth embodiment.
Figure 21B:
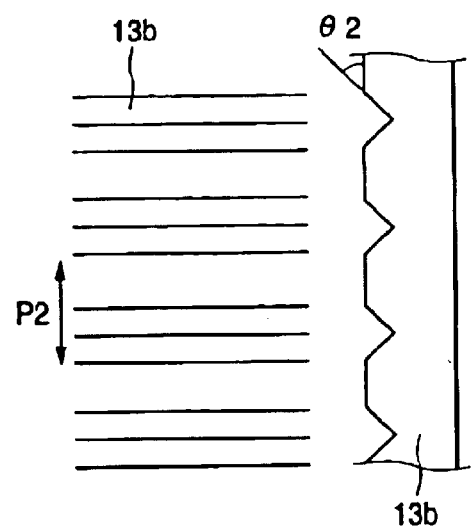

FIGS. 21A, 21B are explanatory diagrams of the optical scale in the fifth embodiment, in which the angles of the V-grooves are different between in the first region 13a illustrated in FIG. 21A and in the second region 13b illustrated in FIG. 21B. The angles of the V-grooves in the first region 13a need to be angles not less than the critical angle because of the necessity for the total reflection, and are thus desirably about 45°, for example. On the other hand, since the V-grooves of the second region 13b need to have only the function of dividing the light toward the light-receiving elements 15 by making use of refraction at the slopes, the angles thereof do not have to be the critical angle equal to those in the first region 13a, but may be angles suitable for the lens power of the light reception side and the arrangement of the light-receiving elements 15.

Figure 5A:
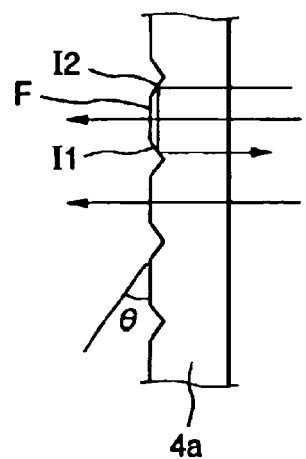
FIG. 5A, FIG. 5B, and FIG. 5C are explanatory diagrams of split reception paths of beams.
Figure 5B:
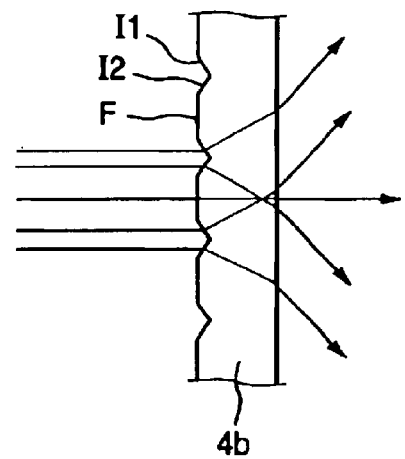
Figure 5C:
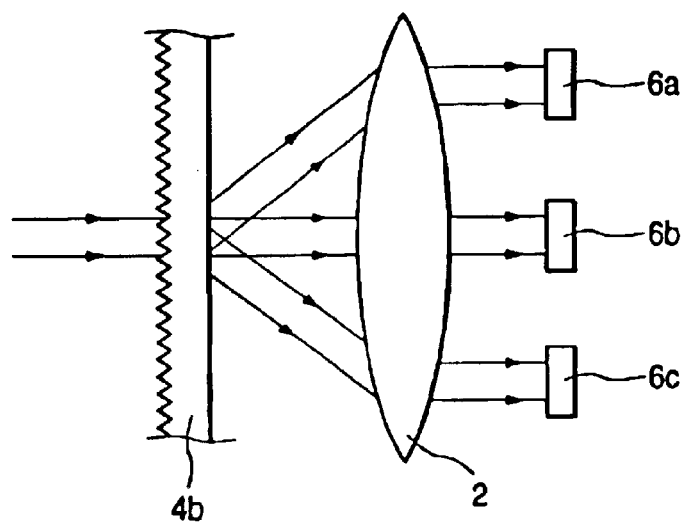
Figure 22A:
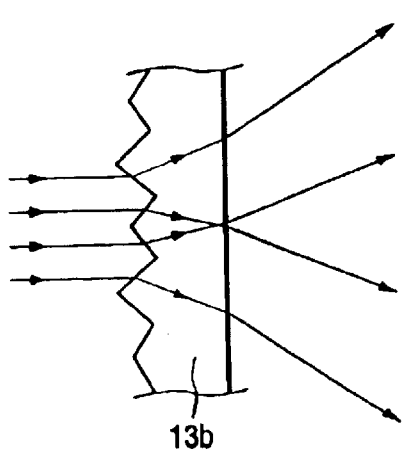
FIG. 22A and FIG. 22B are explanatory diagrams of split reception paths of beams.
Figure 22B:
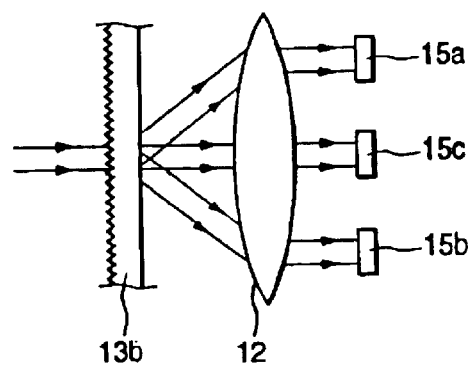

In the case of the conventional example, since the angles of the V-grooves of the second region 13b and the first region 13a are equal, angles of refraction are large as illustrated in FIGS. 5A to 5C, and the lens size on the light reception side and the spacing between the light-receiving elements 6 are also large, thereby increasing the dimensions of the detection head as a result. On the other hand, for example, when the angles of the V-grooves of the second region 13b are smaller than those of the first region 13a as in the present embodiment, the angles of refraction in the second region 13b become smaller as illustrated in FIG. 22A, whereby the size of the lens 12 and the spacing between the light-receiving elements 15a, 15b, 15c can be made smaller as illustrated in FIG. 22B, thereby making the detection head compact.

Figure 23A:
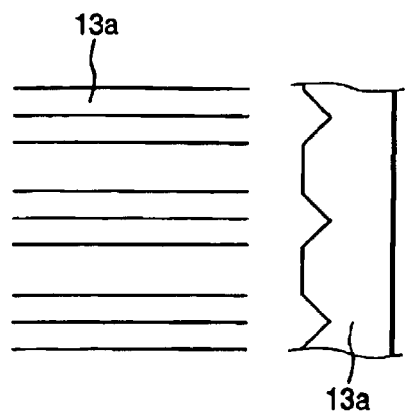
FIG. 23A and FIG. 23B are explanatory diagrams of the groove patterns of the optical scale in the sixth embodiment.
Figure 23B:
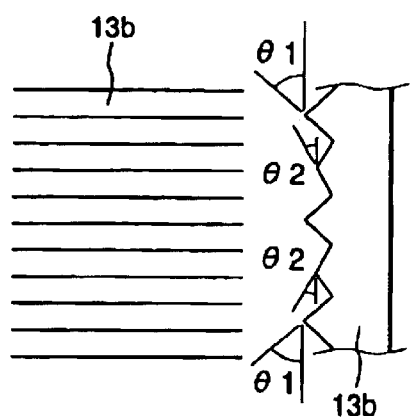

FIGS. 23A and 23B are cross-sectional views of the optical scale in the sixth embodiment, in which the V-shaped grooves of the first region 13a are comprised of flats and V-groove portions similar to those in the conventional example, as illustrated in FIG. 23A, and in which the grooves of the second region 13b are not the simple V-shaped grooves, but the W-shaped grooves in which surfaces of two types of angles θ1, θ2 are arranged alternately, as illustrated in FIG. 23B. The grooves of the second region 13b do not have to be limited to the W-shape, but may be any shape that can divide the incident light into four or more directions.

Figure 24A:
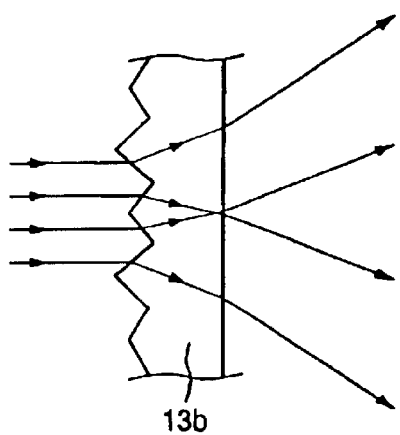
FIG. 24A and FIG. 24B are explanatory diagrams of split reception paths of beams.
Figure 24B:
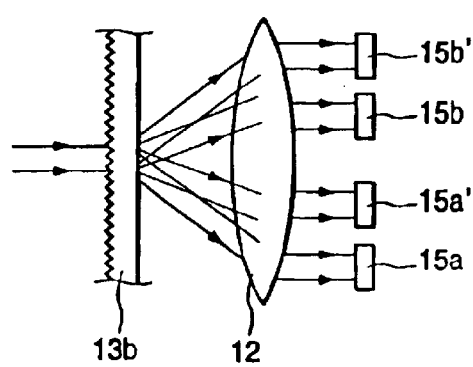

As illustrated in FIG. 24A, the light reflected from the concave mirror 14 is refracted into four directions by the W-grooves of the second region 13b, and the beams separated in the four directions are distributed to the respective light-receiving elements 15a, 15a', 15b, 15b' to be received thereby, as illustrated in FIG. 24B.

Figure 25A:
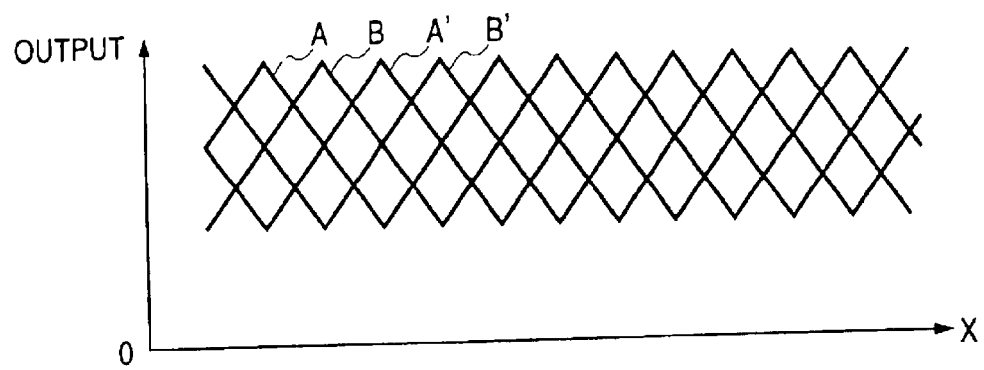
FIG. 25A and FIG. 25B are graphs of output waveforms and processed signals.
Figure 25B:
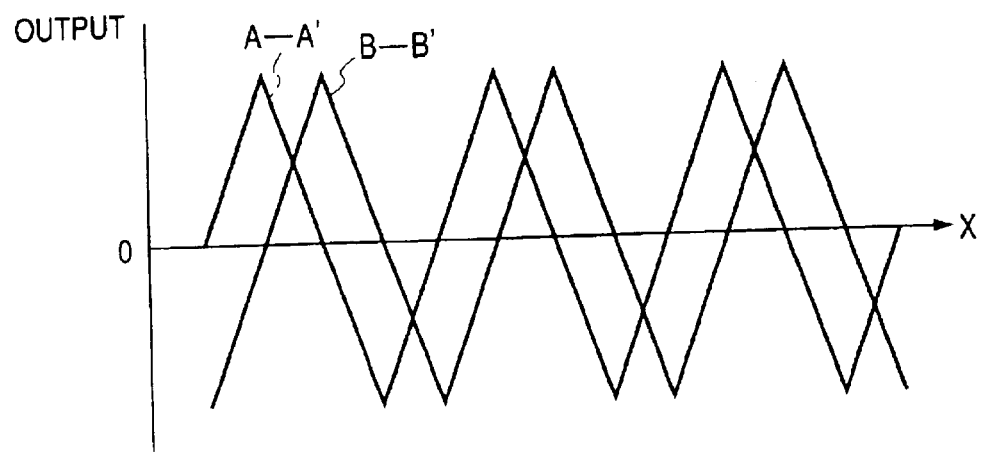

FIG. 25A shows the output waveforms A, A', B, B' of the respective light-receiving elements 15a, 15a', 15b, 15b' in use of the optical scale 13 and the light-receiving elements 15 as described above. The horizontal axis represents the relative displacement x between the optical scale 13 and the detection head and the vertical axis the outputs of the respective light-receiving elements 15a, 15a', 15b, 15b'. Since there is the phase difference of 180° between the outputs A and A' and between the outputs B and B', the difference between the outputs A and A' and the difference between the outputs B and B' are waveforms oscillating around the center of 0 volt, as illustrated in FIG. 25B. When pulses are produced using the 0 volt as a comparison reference value from such waveforms, stable pulses can be always generated without variation in the width and the phase even if there occurs variation in amounts of light.

It is noted here than the third to sixth embodiments described above do not have to be carried out separately but they may also be carried out in combination of their respective elements. For example, when the number of V-grooves in the third embodiment is employed in combination with the angles of the V-grooves in the fifth embodiment, the effects of the both embodiments can be accomplished simultaneously.

The optical encoders described above are arranged so that the scale slits formed in the first region of the optical scale are separated from the scale slits of the second region with each contrivance as described above, whereby they can obtain signals with good contrast against the optical scales of all diameters by use of the common detection head and permit reduction of the lens size on the light reception side and the spacing between the light-receiving elements, so as to make the whole system compact and be always able to generate stable pulses without variation in the width and the phase even if there occurs variation in amounts of light.

For accomplishing the third object as described. previously, the optical encoder is constructed to guide the light from the light-irradiating device into the first region on the relatively movable optical scale having the periodic grating portion on the substrate, reflect and condense the light reflected and diffracted by the grating portion of the first region to guide it to the second region of the optical scale, and receive the light through the grating portion of the second region by the light-receiving device, thereby detecting displacement information of the optical scale.

The optical encoder will be described below in detail, based on the embodiments illustrated.

Figure 26:
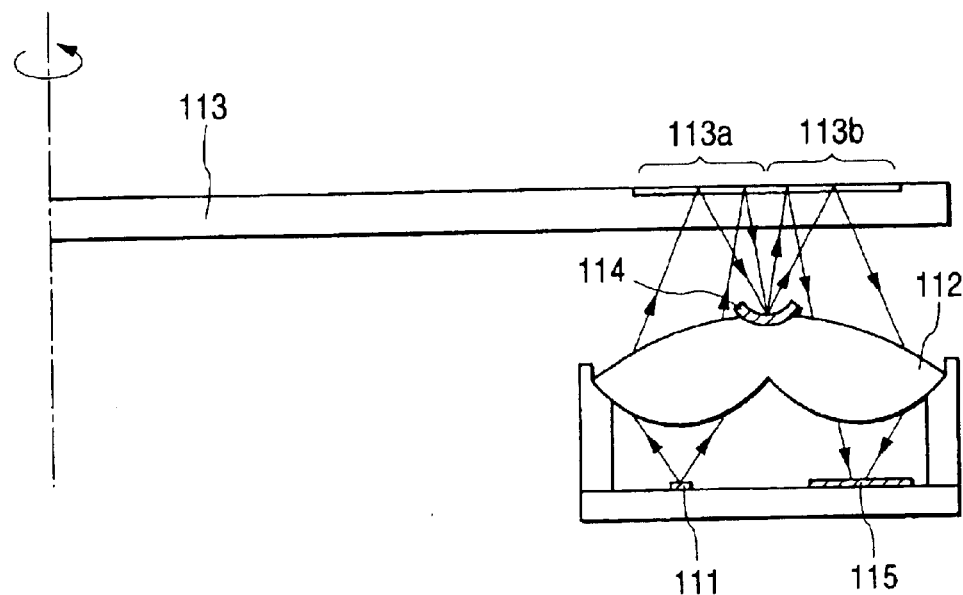
FIG. 26 is a cross-sectional view of the optical encoder in the seventh embodiment.

FIG. 26 is a cross-sectional view of the optical encoder of the seventh embodiment, which is an optical encoder having the optical scale of the rotary type, but which can also be applied to a linear encoder moving rectilinearly. The optical encoder is composed of the light-emitting element 111 such as the LED or the LD, the lens 112 one surface of which has the separate shape consisting of the part on the light projection side and the part on the light reception side, the optical scale 113 made of a transparent material such as polycarbonate or the like and rotating about the rotation axis, the concave mirror 114, and the light-receiving element section 115 consisting of three photodetectors 115a, 115b, 115c. The disklike optical scale 113 is provided with the first region 113a and the second region 113b in which the optical grating is formed in a radial pattern. It is noted here that the number, the pitch, etc. of the grating grooves of the first region 113a do not always have to be matched with those of the second region 113b.

Figure 27:
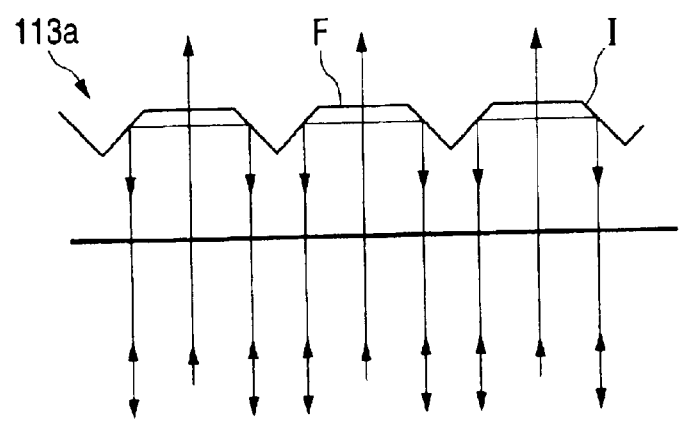
FIG. 27 is an explanatory diagram of the groove pattern in the first region.

FIG. 27 is a cross-sectional view of the first region 113a from the radial direction, and in the first region 113a the grooves of the V-shaped cross section are formed periodically at the pitch P. The angles of slopes of the V-grooves are angles not less than the critical angle, for example 45°, so as to totally reflect the incident light. The light incident to the flats F is transmitted, while the light incident to the slopes I is reflected. Namely, in the first region 113a the grating portion of the V-grooves has the optical action similar to the reflective amplitude diffraction grating.

Figure 28:
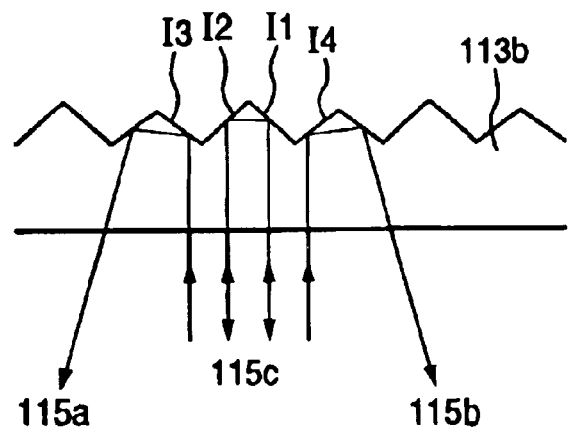
FIG. 28 is an explanatory diagram of the groove pattern in the second region.

FIG. 28 is a cross-sectional view of the second region 113b from the radial direction, and in the second region 113b the grooves of the V-shaped cross section are formed periodically in the radial directions. The angles of all the slopes I1, I2, I3, I4 of these V-grooves are not less than the critical angle for the total reflection. However, the angle between the slopes I1 and I2 is approximately 90°, and the angle between the slopes I3 and I4 is set to an angle slightly larger than 90°.

The light emitted from the light-emitting element 111 is converted into convergent light by the light projection side of the lens 112 to irradiate the first region 113a of the optical scale 113. The grating of the first region 113a diffracts the reflected light to generate beams of the 0-order, ±1-order, ±2-order, . . . diffracted light by the action of the grating, and the beams are condensed onto the surface of the concave mirror 114

The diffracted light thus converged is reflected by the concave mirror 114 to be focused again on the second region 113b of the optical scale 113, whereby an image of the radial grooves is formed on the surface of the optical scale 113. At this time, because of the structure of the slopes I1 to I4 of the second region 113b, the beams incident to the slopes I1, I2 are reflected twice and thereafter travel back opposite to the incident direction, as illustrated in FIG. 28, when viewed from the radial direction. However, the beams are reflected toward the outside, as illustrated in FIG. 26, when observed from the tangential direction. On the other hand, a beam incident to the slope I3 is reflected twice and thereafter is reflected slightly to the left when viewed from the radial direction. A beam incident to the slope I4 is reflected twice and thereafter is reflected slightly to the right when observed from the radial direction.

As described above, the beams separated into the three directions travel through the light reception side of the lens 112 to reach the light-receiving element section 115, whereupon the three photodetectors 115a to 115c of the light-receiving element section 115 detect amounts of the respective beams. Namely, the beams based on the phase relation between the grating of the second region 113b and the interference pattern image formed on the surface thereof are reflected and deflected into the three directions to enter the respective photodetectors 115a to 115c.

Figure 6:
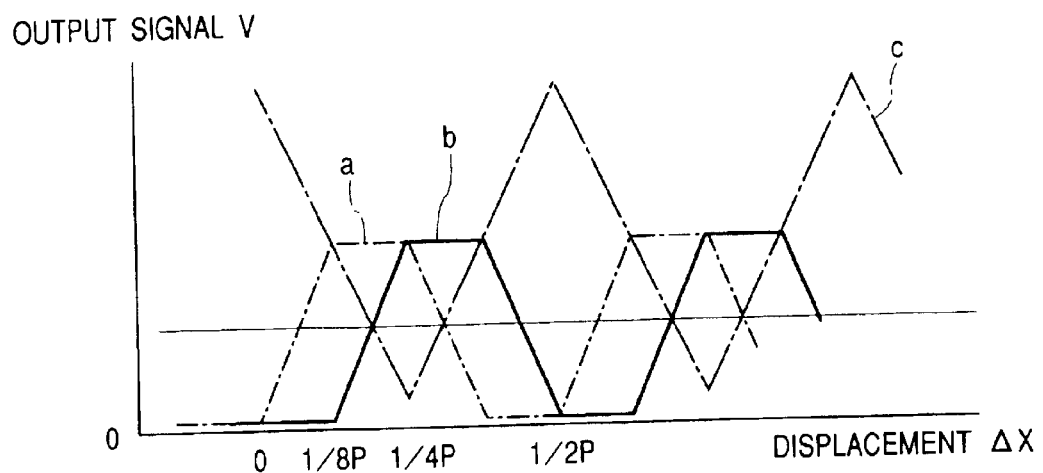
FIG. 6 is a graph of signal outputs from the light-receiving elements.
Figure 8:
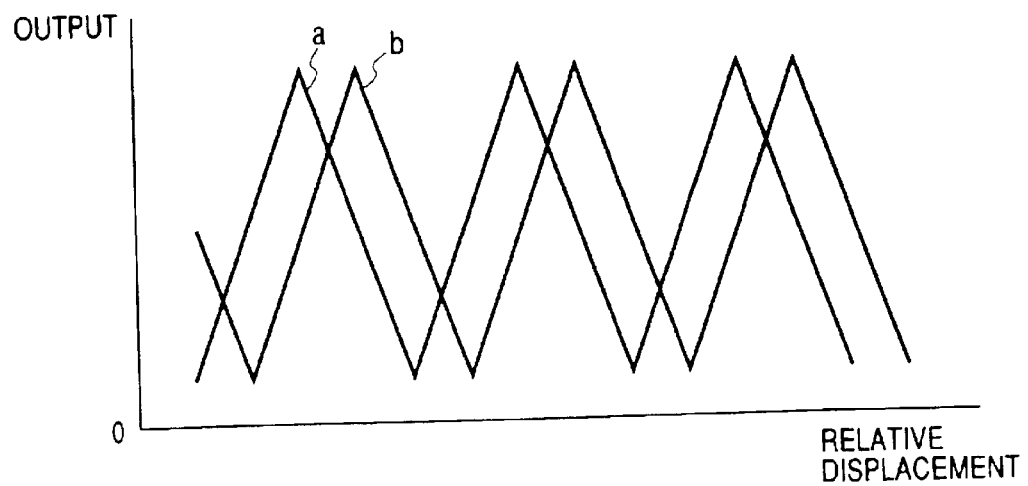
FIG. 8 is a graph of signal outputs of the light-receiving elements.

With rotation of the optical scale 113, there occurs variation in amounts of the light detected by the respective photodetectors 115a to 115c. The light-amount balance among the beams incident to the respective photodetectors 115a to 115c varies according to the relative displacement between the grating position of the second region 113b and the position of the interference pattern image. As a result, if the optical scale 113 rotates counterclockwise, there will appear variation in amounts of light due to the rotation of the optical scale 113 as illustrated in FIG. 6 in the case of the conventional example.

Figure 29:
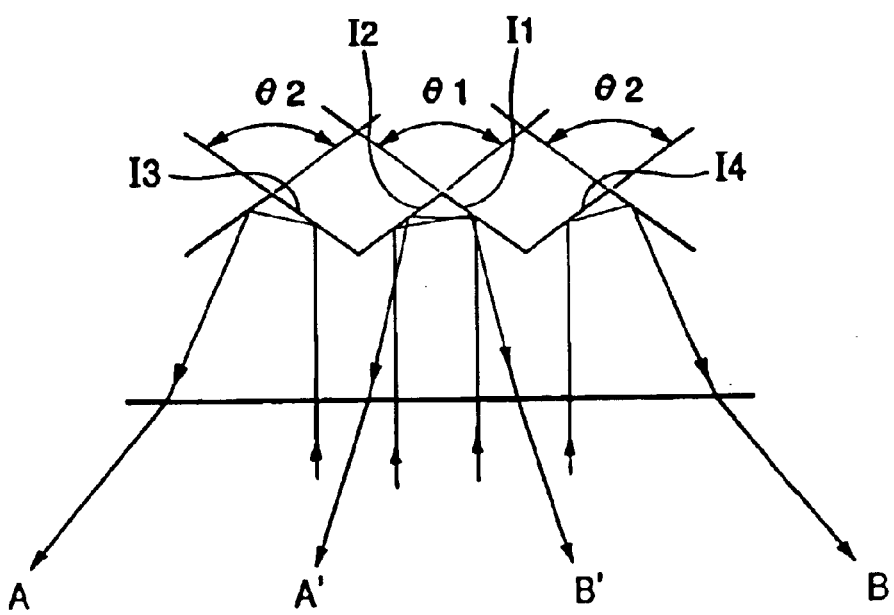
FIG. 29 is an explanatory diagram of the groove pattern in the second region in the eighth embodiment.

FIG. 29 shows the cross-sectional shape of the grating of the second region 113b in the eighth embodiment, in which the angle θ1 between the slopes I1 and I2 of the V-grooves deviates from 90°. The angle θ2 between the slopes I3 and I4 is an angle a little greater than 90°, as in the seventh embodiment. The light-receiving element section 115 is composed of four photodetectors 115a, 115a', 115b, 115b'. The grooves of the second region 113b do not always have to be limited to the W-shape, but may be of any shape that can split the light into four or more directions. Although the angle θ2 between the slopes I1, I2 of the V-grooves is slightly greater than 90° in the present embodiment, the like function can also be implemented by making the angle smaller than 90°.

As constructed in the above structure, the light incident to the left slopes I1 and the light incident to the right slopes I2 is separated into right and left beams and the light incident to the slopes I3, I4 is divided into further outside beams. Namely, the light reflected from the concave mirror 114 is reflected into the four directions by the grooves of the second region 113b. The beams thus separated in the four directions travel through the lens 112 to reach the light-receiving element section 115 to be distributed to and received by the respective photodetectors 115a, 115a', 115b, 115b' of the light-receiving element section 115.

Figure 30A:
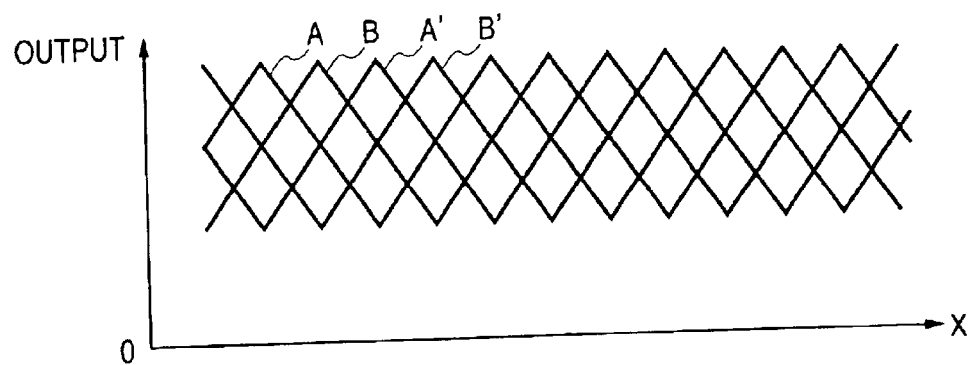
FIG. 30A and FIG. 30B are graphs of output waveforms of the light-receiving elements and processed signals.
Figure 30B:
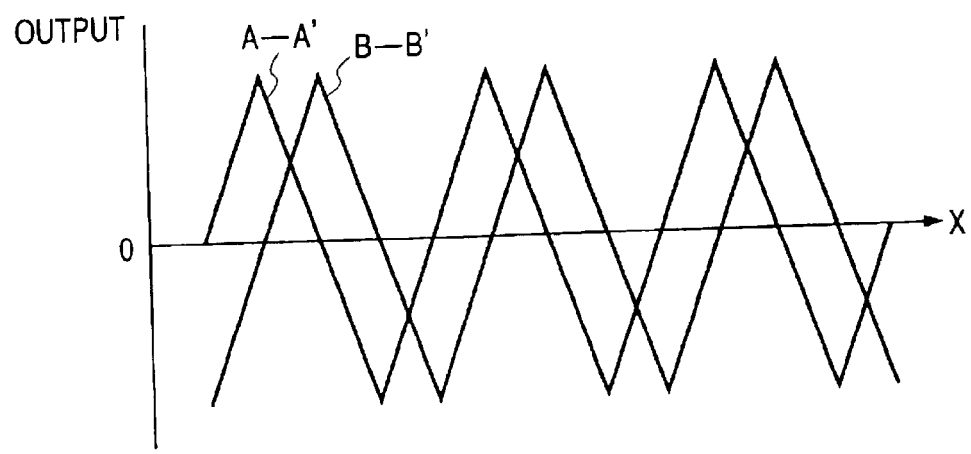

FIG. 30A is a diagram to show the output waveforms from the respective photodetectors 115a, 115a', 115b, 115b', in which the horizontal axis represents the relative displacement x between the scale and the detection head and the vertical axis the outputs A, A', B, B' of the respective photodetectors 115a, 115a', 115b, 115b'. There is the phase difference of 180° between the outputs A and A' and between the outputs B and B'. Therefore, the difference between the outputs A and A' and the difference between the outputs B and B' yield the waveforms oscillating around the center of 0 volt as illustrated in FIG. 30B. From the waveforms oscillating around the center of 0 volt as described above, pulses are produced using the 0 volt as a comparison reference value, whereby the stable pulses can be always generated without variation in the width and the phase even if there occurs variation in amounts of light.

Figure 31:
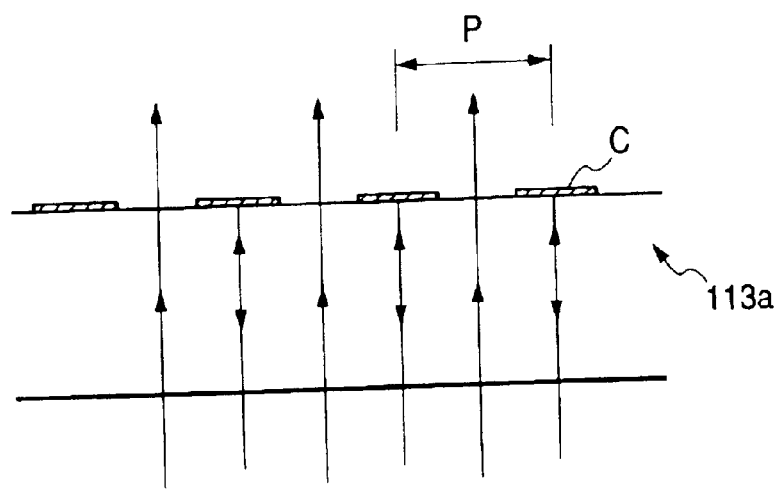
FIG. 31 is an explanatory diagram of the groove pattern in the first region in the ninth embodiment.

FIG. 31 shows the cross-sectional shape of the grating of the first region 113a of the optical scale 113 in the ninth embodiment. The seventh embodiment employed the beams totally reflected twice by the V-grooves, whereas the present embodiment employs the grating in which radial patterns of reflecting film C are formed at the pitch P, thereby presenting the same function as in the seventh embodiment.

Figure 32:
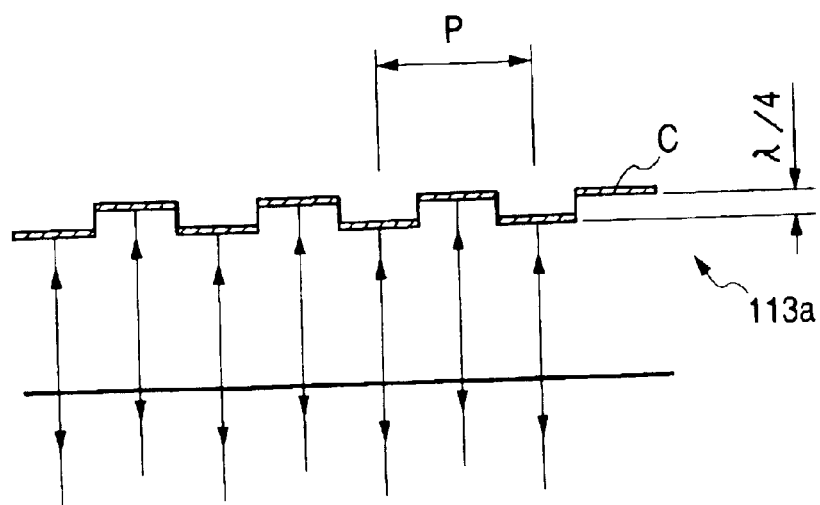
FIG. 32 is an explanatory diagram of the groove pattern in the first region in the tenth embodiment.

FIG. 32 shows the cross-sectional shape of the grating of the first region 113a of the optical scale 113 in the tenth embodiment. In this case, grooves having the level difference equal to a quarter wavelength are formed as alternate radial patterns at the pitch P and the reflecting film C is formed thereon. The beams are reflected and diffracted by the grating of this first region 113a. In the normal diffraction there appear beams of the 0-order, ±1-order, ±2-order, . . . diffracted light. However, since there are beams with the phase difference of a half wavelength mixed in the 0-order, the 0-order diffracted light will vanish. As a consequence, beams of the strongest intensity are the beams of ±1-order diffracted light.

This ±1-order diffracted light is condensed onto the surface of the concave mirror 114 and the diffracted light thus condensed is reflected by the concave mirror 114 to be focused again on the grating of the second region 113b of the optical scale 113 to form an image of the radial grooves on the surface of the optical scale 113 The beams arriving at the second region 113b are processed thereafter in the process similar to that in the seventh embodiment to detect a displacement amount.

In the case of the present embodiment, since the light traveling through the first region 113a is almost 0, strong signals can be obtained with good S/N ratios; further, the depth of focus is deep, because the diffraction image formed on the grating of the second region 113b is mainly comprised of the two beams of ±1-order diffracted light. This relaxes the accuracy necessary for the relative positional relation between the optical scale 113 and the light-receiving element section 115 to facilitate the assembly accordingly.

Figure 33:
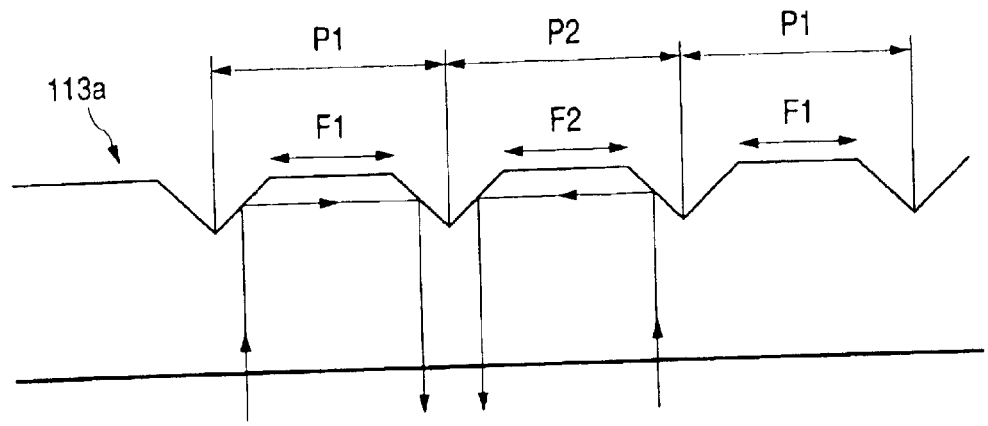
FIG. 33 is an explanatory diagram of the groove pattern in the first region in the eleventh embodiment.

FIG. 33 shows the cross-sectional shape of the grating of the first region 113a of the optical scale 113 in the eleventh embodiment, which is substantially the same shape as the grating shape of the seventh embodiment, but the widths F1, F2 of the flats F are different by a half wavelength from each other. Therefore, the pitches P1, P2 of the bottoms of the V-grooves are different by a half wavelength from each other. Because of this arrangement, the beams reflected from the both slope surfaces of the V-grooves have the phase shift of a half wavelength from each other. Therefore, the 0-order diffracted light vanishes, as in the tenth embodiment, so that the diffraction image formed on the grating of the second region 113b is mainly comprised of the two beams of ±1-order diffracted light, so as to make the depth of focus deeper.

Figure 34:
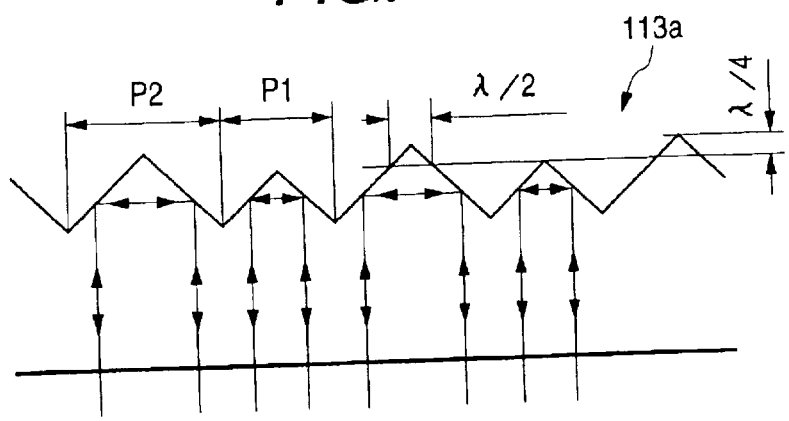
FIG. 34 is an explanatory diagram of the groove pattern in the first region in the twelfth embodiment.

FIG. 34 shows the cross-sectional shape of the grating of the first region 113a of the optical scale 113 in the twelfth embodiment, which is obtained by excluding the flats F1, F2 of the first region 113a from the shape of FIG. 33. For implementing the phase shift of a half wavelength between the beams reflected from the both slopes of the V-grooves, the difference of a half wavelength is given every other pitch P1, P2 of the bottoms of the V-grooves. With the transmission loss of beam being almost 0, the diffracted image with the deep depth of focus is formed on the second region 113b. In the case of the present embodiment there is no need for provision of the reflecting film C as described in the tenth embodiment.

Figure 35:
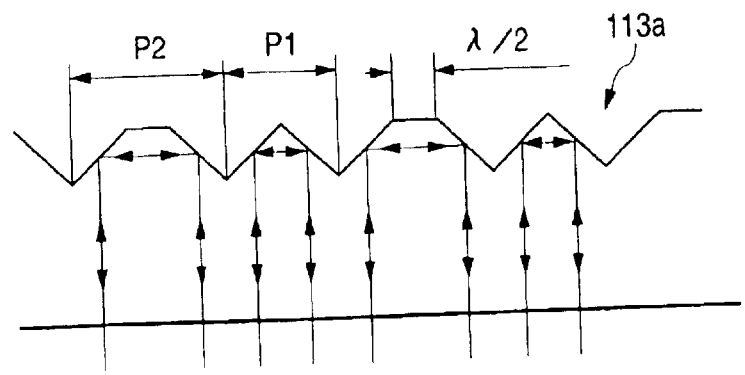
FIG. 35 is an explanatory diagram of the groove pattern in the first region in the thirteenth embodiment.

FIG. 35 shows the cross-sectional shape of the grating of the first region 113a of the optical scale 113 in the thirteenth embodiment, which is the shape obtained by excluding one out of every two flats F1, F2 of the first region 113a of FIG. 33. Just as in FIG. 34, there is the difference of a half wavelength at every other pitch P1, P2 of the bottoms of the V-grooves, so as to implement the phase shift of a half wavelength between the beams reflected from the both slopes of the V-grooves. With the transmission loss of beam being almost 0, the diffracted image with the deep depth of focus is formed on the second region 113b. In the case of the present embodiment there is also no need for the provision of the reflecting film C described in the tenth embodiment.

The optical encoders described above are constructed so that all the components are placed on one side of the optical scale, and thus the axial height is small. Since the optical encoders obviate the need for a fixing arm for fixing the parts on the opposite side of the optical scale on the theoretical basis, there is no portion projecting to the outside from the outside periphery of the optical scale D and this decreases the total size and the number of components. The displacement information can be detected with good contrast by the compact structure.

Figure 36:
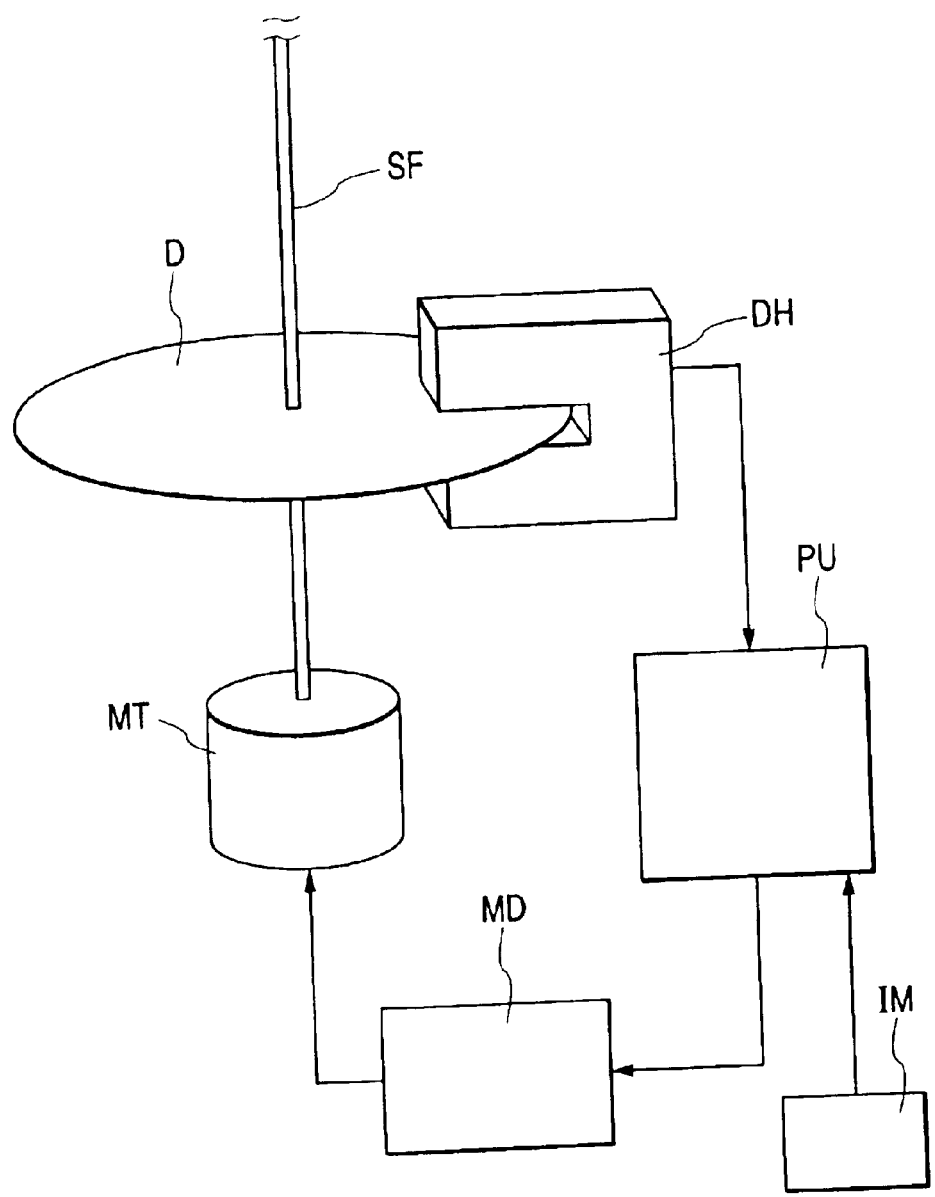
FIG. 36 is a schematic diagram to show the structure of a driver system in the fourteenth embodiment.

FIG. 36 is a schematic, structural diagram of a driver system according to the fourteenth embodiment of the present invention. In the figure, DH represents a detection head in which the entire optical structure is placed except for the optical scale of the optical encoder described in either of the above embodiments, PU a signal processing circuit for performing signal processing of the outputs from the respective light-receiving elements in the detection head to measure an incremental rotation amount and a rotation direction if necessary to generate a control signal, IM an input section for entry of a rotation command to the signal processing circuit PU, MD a motor driver for carrying out driving control of the motor in response to the control signal from the signal processing circuit PU, Mt a motor, and SF a shaft driven (to rotate herein) by the motor to transmit the driving force to a driven portion not illustrated. The present embodiment can be used, for example, as a driver system for driving a drum of a printer or a copier.

The signal processing circuit PU generates the control signal, based on the outputs from the respective light-receiving elements and the command input information from the input section, thereby controlling the rotational driving of the shaft SF by the motor MT.

The system can also be modified to use a linear motor in place of the above motor and detect a translational driving amount by the optical encoder.

What is claimed is:

1. An optical encoder comprising:

a light irradiating system;

an optical scale having a grating for transmitting or reflecting incident light;

four light-receiving elements disposed essentially in a line; and an optical system constructed so as to amplitude-modulate light, traveling from said light irradiating system to said optical scale and transmitted or reflected by the grating, by a dividing element in which a plurality of V-shaped grooves are juxtaposed, and so as to divide the amplitude-modulated light into beams along a plurality of different directions to guide the beams to respective light-receiving elements;

wherein said dividing element is comprised of repetitions of such structure that a plurality of V-grooves, each having two planes of mutually different slope magnitudes, are juxtaposed at a predetermined pitch to form four beams having different phases arranged for reception by the four light-receiving elements.

2. The optical encoder according to claim 1, wherein said four beams form two sets of beams having a phase relation of 180°.

3. The optical encoder according to claim 2, wherein said dividing element comprises repetitions of four types of different planes.

4. The optical encoder according to claim 1, wherein said dividing element and said optical scale are comprised of a common member.

5. The optical encoder according to claim 4, wherein a portion functioning as said dividing element of said common member is provided in an outside region or in an inside region of said grating.

6. An optical encoder comprising:

a light irradiating system;

an optical scale comprising scale slits of a periodic structure;

a light-receiving element; and an optical system constructed so as to make light, traveling from said light irradiating system to the scale slits of a first region of said optical scale, incident to the scale slits of a second region of said optical scale by a mirror or another optical element to guide the light having passed via the scale slits of the second region to said light-receiving element;

wherein in said optical scale the scale slits of said first and second regions are comprised of grooves of V-shaped cross section, and slope magnitudes of the V-shaped cross section in the first region are different from slope magnitudes of the V-shaped cross section in the second region, and wherein slope magnitudes are different from each other between the grooves of the V-shaped cross section of the scale slits in said first and second regions to form four beams having different phases.

7. The optical encoder according to claim 6, wherein the slope magnitudes of the V-shaped grooves of the scale slits in said first region are smaller than those in said second region.

8. The optical encoder according to claim 6, said optical encoder being used for detection of an angle or a speed of relative rotation of said optical scale.

9. A driving system comprising:

a driver system;

a control system for controlling driving of said driver system; and an optical encoder for detecting information on the driving of said driver system to output a signal to said control system, said optical encoder comprising:

(1) a light irradiating system;

(2) an optical scale having a grating for transmitting or reflecting incident light;

(3) four light-receiving elements disposed essentially in a line; and (4) an optical system constructed so as to amplitude-modulate light, traveling from said light irradiating system to said optical scale and transmitted or reflected by the grating, by a dividing element in which a plurality of V-shaped grooves are juxtaposed, and so as to divide the amplitude-modulated light into beams along a plurality of different directions to guide the beams to respective separate light-receiving elements;

wherein said dividing element is comprised of repetitions of such structure that a plurality of V-grooves, each of which has two planes of mutually different slope magnitudes, are juxtaposed at a predetermined pitch to form four beams having different phases arranged for reception by the four light-receiving elements.

10. A driving system comprising:

a driver system;

a control system for controlling driving of said driver system; and an optical encoder for detecting information on the driving of said driver system to output a signal to said control system, said optical encoder comprising:

(1) a light irradiating system;

(2) an optical scale comprising scale slits of a periodic structure;

(3) a light-receiving element; and (4) an optical system constructed so as to make light, traveling from said light irradiating system of the scale slits of a first region of said optical scale, incident to the scale slits of a second region of said optical scale by a mirror or another optical element to guide the light having passed, via the scales slits of the second region to said light-receiving element;

wherein in said optical scale the scale slits of said first and second regions are comprised of grooves of V-shaped cross section, and slope magnitudes of the V-shaped cross section in the first region are different from slope magnitudes of the V-shaped cross section in the second region; and wherein slope magnitudes are different from each other between the grooves of the V-shaped cross section of the scale slits in said first and second regions to form four beams having different phases.

11. A driving system comprising:

a driver system;

a control system for controlling driving of said driver system; and an optical encoder for detecting information on the driving of said driver system to output a signal to said control system, said optical encoder comprising:

(1) a light irradiating system;

(2) an optical scale comprising scale slits of a periodic structure;

(3) a light-receiving element; and (4) an optical system constructed so that light, traveling from said light irradiating system to the scale slits of a first region of said optical scale and reflected by the first region, is reflected and condensed via only one condensing mirror onto the scale slits of a second region of said optical scale and so that the light, having passed via the scale slits of the second region, is guided to said light-receiving element wherein the first region and second region are adjacently positioned along a radial direction;

wherein in said optical scale the scale slits of said first and second regions are comprised of grooves of V-shaped cross section, and slope magnitudes of the V-shaped cross section in the first section are different from slope magnitudes of the V-shaped cross section in the second region, and wherein slope magnitudes are different from each other between the grooves of the V-shaped cross section of the scale slits in said first and second regions to form four beams having different phases.

* * * * *

UNITED STATES PATENT AND TRADEMARK OFFICE
CERTIFICATE OF CORRECTION

PATENT NO.   : 6,803,560 B1
DATED        : October 12, 2004
INVENTOR(S)  : Ichiro Okumura et al.

It is certified that error appears in the above-identified patent and that said Letters Patent is hereby corrected as shown below:

Title page,
Item [56], References Cited, FOREIGN PATENT DOCUMENTS, "JP 11-23324 1/1999" should be deleted.

Column 2,
Line 30, "grating among the light" should read -- grating, among the light, --.

Column 4,
Line 20, "by" should read -- is received by --.

Column 8,
Line 49, "from" should read -- with --;
Line 64, "between on" should read -- for --, and "and on" should read -- and --.

Column 9,
Line 24, "becomes" should read -- arises --;
Line 31, "to" should read -- with --;
Line 53, "between in" should read -- between --; and
Line 54, "and in" should read -- and --.

Column 10,
Line 50, "of" should read -- with --.

Column 13,
Line 27, "113 The" should read -- 113. The --;
Lines 47 and 60, "the both" should read -- both --.

Column 14,
Line 8, "the both" should read -- both --; and
Line 37, "Mt" should read -- MT --.

UNITED STATES PATENT AND TRADEMARK OFFICE
CERTIFICATE OF CORRECTION

PATENT NO. : 6,803,560 B1
DATED : October 12, 2004
INVENTOR(S) : Ichiro Okumura et al.

It is certified that error appears in the above-identified patent and that said Letters Patent is hereby corrected as shown below:

Column 16,
Line 23, "scales" should read -- scale --; and
Line 55, "direction;" should read -- direction, --.

Signed and Sealed this

Seventh Day of June, 2005

JON W. DUDAS
*Director of the United States Patent and Trademark Office*